US012715496B2

(12) United States Patent
Huang et al.

(10) Patent No.: US 12,715,496 B2

(45) Date of Patent: Aug. 25, 2026

(54) ELECTRIC POWER STEERING APPARATUS AND CONTROL METHOD THEREOF

(71) Applicant: Yinwang Intelligent Technologies Co., Ltd., Shenzhen (CN)

(72) Inventors: Xin Huang, Shanghai (CN); Jie Li, Shenzhen (CN); Fengyu Liu, Shanghai (CN); Zhimin Zhang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 925 days.

(21) Appl. No.: 17/953,083

(22) Filed: Sep. 26, 2022

(65) Prior Publication Data

US 2023/0013239 A1 Jan. 19, 2023

Related U.S. Application Data

(63) Continuation of application No. PCT/CN2021/078225, filed on Feb. 26, 2021.

(30) Foreign Application Priority Data

Mar. 31, 2020 (CN) ........................ 202010241515.6

(51) Int. Cl.
*B62D 5/04* (2006.01)

(52) U.S. Cl.
CPC ......... *B62D 5/0463* (2013.01); *B62D 5/0481* (2013.01)

(58) Field of Classification Search
CPC . B62D 7/15809; B62D 5/0463; B62D 5/0493

(Continued)

(56) References Cited

U.S. PATENT DOCUMENTS

| | | | | |
|---|---|---|---|---|
| 9,948,229 | B2 * | 4/2018 | Ide | B60L 3/003 |
| 2002/0084757 | A1 * | 7/2002 | Ewbank | B62D 5/003 318/34 |

(Continued)

FOREIGN PATENT DOCUMENTS

| | | | |
|---|---|---|---|
| CN | 105207542 | A | 12/2015 |
| CN | 104936850 | B | 3/2017 |

(Continued)

OTHER PUBLICATIONS

Office Action in Chinese Appln. No. 202010241515.6, dated Mar. 11, 2022, 16 pages (with English translation).

(Continued)

*Primary Examiner* — Jacob D Knutson

(74) *Attorney, Agent, or Firm* — Fish & Richardson P.C.

(57) ABSTRACT

An electric power steering apparatus and a control method thereof are disclosed. One example electric power steering apparatus includes: a first motor, configured to provide steering assistance corresponding to rotation of a steering wheel, wherein the first motor is powered by two power supplies, and each of the two power supplies drives the first motor to generate part of the steering assistance; and a second motor, configured to provide additional steering assistance corresponding to the rotation of the steering wheel when the first motor loses part or all of the steering assistance, wherein the additional steering assistance comprises at least part of the steering assistance lost by the first motor, and the second motor is driven by one power supply coupled from the two power supplies, to generate the additional steering assistance.

20 Claims, 14 Drawing Sheets

(58) Field of Classification Search
USPC .......................................... 180/402, 443, 444
See application file for complete search history.

(56) References Cited

U.S. PATENT DOCUMENTS

| | | | | |
|---|---|---|---|---|
| 2014/0249724 | A1 | 9/2014 | Eschtruth et al. | |
| 2017/0291635 | A1 * | 10/2017 | Yamasaki .............. | H02K 5/225 |
| 2018/0346014 | A1 | 12/2018 | Beyerlein et al. | |

FOREIGN PATENT DOCUMENTS

| | | | | |
|---|---|---|---|---|
| CN | 206704287 | U | | 12/2017 |
| CN | 109334756 | A | | 2/2019 |
| CN | 208530686 | U | | 2/2019 |
| CN | 109606465 | A | | 4/2019 |
| CN | 109693709 | A | | 4/2019 |
| CN | 208682909 | U | | 4/2019 |
| CN | 109733460 | A | | 5/2019 |
| CN | 109733461 | A | * | 5/2019 |
| CN | 110040173 | A | | 7/2019 |
| CN | 110588769 | A | | 12/2019 |
| DE | 102011118172 | A1 | | 5/2013 |
| DE | 102015104850 | A1 | | 10/2016 |
| EP | 1219525 | A2 | | 7/2002 |
| WO | 03058806 | A2 | | 7/2003 |

OTHER PUBLICATIONS

International Search Report and Written Opinion in International Appln. No. PCT/CN2021/078225, mailed on May 27, 2021, 15 pages (with English translation).
Extended European Search Report in European Appln No. 21779869.3, dated Aug. 21, 2023, 6 pages.

* cited by examiner

ELECTRIC POWER STEERING APPARATUS AND CONTROL METHOD THEREOF

CROSS-REFERENCE TO RELATED APPLICATIONS

This application is a continuation of International Patent Application No. PCT/CN2021/078225, filed on Feb. 26, 2021, which claims priority to Chinese Patent Application No. 202010241515.6, filed on Mar. 31, 2020. The disclosures of the aforementioned applications are hereby incorporated by reference in their entireties.

TECHNICAL FIELD

This application relates to the field of automotive engineering technologies, and furthermore, to an electric power steering apparatus and a control method thereof.

BACKGROUND

In vehicle's structure, a power transmission system mounted between steering wheel and vehicle wheels is referred to as a steering system. When the vehicle drives, the steering system is used to maintain or change a driving direction of the vehicle. Currently, many vehicles use electric power steering systems. A conventional electric power steering system usually adopts a non-redundancy design, that is, which includes only one electronic control unit ECU and one motor, and is powered by one power supply. When any node in the electric power steering system is faulty, the system may shut down and completely replaced by manual operations in providing steering effort. However, with development of driving automation technologies, especially application of an advanced driving assistant system (ADAS), the electric power steering system with the non-redundancy design cannot meet the safety requirement of vehicle driving.

Currently, Level 4 (L4) driving automation requires that a redundancy capability of an electric power steering system reaches 75%. That is, when some nodes of the electric power steering system are faulty, the electric power steering system can continue to maintain 75% of steering assistance. However, currently, for redundancy design solutions of the electric power steering system, some solutions cannot meet a requirement of Level 4 (L4) on the redundancy capability, and some solutions use complex drive circuits, a plurality of power supplies (four or more), and complex control logic designs. This causes a large quantity of faulty nodes and is unfavorable to implementation.

SUMMARY

This application provides an electric power steering apparatus and a control method thereof, which can meet a redundancy capability requirement of Level 4 (L4) driving automation on electric power steering, have a simple structure, and are easy to implement.

According to a first aspect, this application provides an electric power steering apparatus. The apparatus includes a first motor, configured to provide steering assistance corresponding to rotation of a steering wheel, where the first motor is powered by two power supplies, and each of the two power supplies drives the first motor to generate a part of the steering assistance; and a second motor, configured to provide additional steering assistance corresponding to the rotation of the steering wheel when the first motor loses a part or all of the steering assistance, where the additional steering assistance includes at least a part of the steering assistance lost by the first motor, and the second motor is driven by one power supply coupled from the two power supplies, to generate the additional steering assistance. Therefore, when the first motor is not driven by one power supply due to a single-point fault of the electric power apparatus, the first motor can still provide 50% of the steering assistance. In this way, the second motor needs to provide only 25% of the steering assistance, to enable the electric power apparatus to continue to maintain output of 75% of the steering assistance. In this way, a redundancy capability requirement of Level 4 (L4) is met.

In an implementation, the first motor includes six phase windings. The electric power steering apparatus further includes: a first control unit, configured to be coupled to a first power supply of the two power supplies, and output the first power supply to three phase windings of the six phase windings; and a second control unit, configured to be coupled to a second power supply of the two power supplies, and output the second power supply to the other three phase windings of the six phase windings. Therefore, the electric power apparatus has only 9 motor phases in total, with a simple structure easy for implementation.

In an implementation, an isolated power supply unit is configured to couple the two power supplies into one power supply. A third control unit is configured to be coupled to the isolated power supply unit, and output the power supply coupled by the isolated power supply unit to the second motor. Therefore, the second motor is powered by the power supply obtained after the first power supply and the second power supply are coupled. When either of the first power supply and the second power supply is faulty, driving of the second motor is not affected.

In an implementation, the first control unit is further configured to obtain a first TAS signal from a torque angle sensor TAS. The second control unit is further configured to obtain a second TAS signal from the torque angle sensor TAS. The first TAS signal and the second TAS signal indicate an angle and/or torque of the rotation of the steering wheel. Therefore, the control units can determine whether the single-point fault occurs in the electric power apparatus based on the TAS signals and a CAN signal.

In an implementation, the first control unit is further configured to obtain a first CAN signal from a controller area network CAN, and determine whether the first CAN signal is normal. The second control unit is further configured to obtain a second CAN signal from the controller area network CAN, and determine whether the second CAN signal is normal. The first control unit or the second control unit is further configured to determine whether the first TAS signal and the second TAS signal are normal.

In an implementation, the first control unit and/or the second control unit are/is further configured to send a first indication signal to an industrial computer of a vehicle when at least one of the first TAS signal, the second TAS signal, the first CAN signal, and the second CAN signal is faulty, to enable the industrial computer to lower a driving automation level of the vehicle, and improve traveling safety.

In an implementation, the first control unit is further configured to obtain a first MPS signal from a motor position sensor MPS. The second control unit is further configured to obtain a second MPS signal from the motor position sensor MPS. The first MPS signal and the second MPS signal indicate a rotor position of the first motor. Therefore, the control units can determine whether the first motor is faulty based on the MPS signals.

In an implementation, when the first TAS signal, the second TAS signal, the first CAN signal, and the second CAN signal are all normal, the first control unit is further configured to determine whether the first MPS signal and the first power supply are normal, the second control unit is further configured to determine whether the second MPS signal and the second power supply are normal, and the first control unit and/or the second control unit are/is further configured to determine whether the first motor is normal.

In an implementation, when the first TAS signal, the second TAS signal, the first CAN signal, and the second CAN signal are all normal, the first control unit is further configured to determine whether the first control unit is normal, and the second control unit is further configured to determine whether the second control unit is normal.

In an implementation, when the first TAS signal, the second TAS signal, the first CAN signal, and the second CAN signal are all normal, the first control unit is further configured to communicate with the second control unit by using a third CAN signal of the controller area network CAN, to determine whether the second control unit is normal, and the second control unit is further configured to communicate with the first control unit by using the third CAN signal, to determine whether the first control unit is normal.

In an implementation, when the first TAS signal, the second TAS signal, the first CAN signal, and the second CAN signal are all normal, the third control unit is further configured to communicate with the first control unit by using a third CAN signal, to determine whether the first control unit is normal, and the third control unit is further configured to communicate with the second control unit by using the third CAN signal, to determine whether the second control unit is normal.

In an implementation, the third control unit is further configured to start the second motor when at least one of the first MPS signal, the second MPS signal, the first control unit, the second control unit, a first power supply 201, a second power supply 202, and the first motor is faulty, to provide the additional steering assistance, so that the electric power apparatus continues to maintain the output of 75% of the steering assistance, to meet the redundancy capability requirement of Level 4 (L4).

In an implementation, the third control unit is further configured to send a second indication signal to an industrial computer of a vehicle when the three phase windings of the first motor and/or the first control unit are/is faulty, and the other three phase windings of the first motor and/or the second control unit are/is faulty, to enable the industrial computer to control the vehicle to stop, to avoid an accident.

In an implementation, the third control unit is further configured to send a first indication signal to an industrial computer of a vehicle when the three phase windings of the first motor and/or the first control unit are/is faulty, and the other three phase windings of the first motor and the second control unit are normal, to enable the industrial computer to lower a driving automation level of the vehicle, to improve traveling safety.

In an implementation, the third control unit is further configured to send a first indication signal to an industrial computer of a vehicle when the three phase windings of the first motor and the first control unit are normal, and the other three phase windings of the first motor and/or the second control unit are/is faulty, to enable the industrial computer to lower a driving automation level of the vehicle, to improve traveling safety.

In an implementation, the first control unit is configured to obtain a voltage of the first power supply, and determine whether the first power supply is normal based on the voltage of the first power supply. The second control unit is configured to obtain a voltage of the second power supply, and determine whether the second power supply is normal based on the voltage of the second power supply.

In an implementation, the first control unit is configured to obtain an input current of the three phase windings, and determine whether the first motor is normal based on the input current of the three phase windings and/or the first MPS signal. The second control unit is configured to obtain an input current of the other three phase windings, and determine whether the first motor is normal based on the input current of the other three phase windings and/or the second MPS signal.

According to a second aspect, this application provides a control method. The method is applied to the electric power steering apparatus according to the first aspect and the implementations of the first aspect. The method includes: shutting down a second motor when a first motor can provide all of steering assistance corresponding to rotation of a steering wheel; and starting the second motor when the first motor loses a part or all of the steering assistance corresponding to the rotation of the steering wheel. Therefore, when the first motor is not driven by one power supply due to a single-point fault of the electric power apparatus, the first motor can still provide 50% of the steering assistance. In this way, the second motor needs to provide only 25% of the steering assistance, to enable the electric power apparatus to continue to maintain output of 75% of the steering assistance. In this way, a redundancy capability requirement of Level 4 (L4) is met.

According to a third aspect, this application further provides a vehicle. The vehicle includes the electric power steering apparatus provided in the foregoing aspects, and may be configured to perform the method in the foregoing aspects.

According to a fourth aspect, this application further provides a computer storage medium. The computer storage medium stores computer instructions. When the computer instructions are run on a computer, the computer performs the method in the foregoing aspects.

According to a fifth aspect, this application further provides a computer program product including instructions. When the computer program product runs on a computer, the computer performs the method in the foregoing aspects.

According to a sixth aspect, this application further provides a chip system. The chip system includes a processor, configured to support the foregoing apparatus or device in implementing functions in the foregoing aspects, for example, generating or processing information in the foregoing methods. In a possible design, the chip system further includes a memory, configured to store program instructions and data that are necessary for the foregoing module or device. The chip system may include a chip, or may include a chip and another discrete component.

BRIEF DESCRIPTION OF DRAWINGS

FIG. 10 is a detection flowchart in which a first control unit detects whether a second control unit is normal;

DESCRIPTION OF EMBODIMENTS

Figure 1:
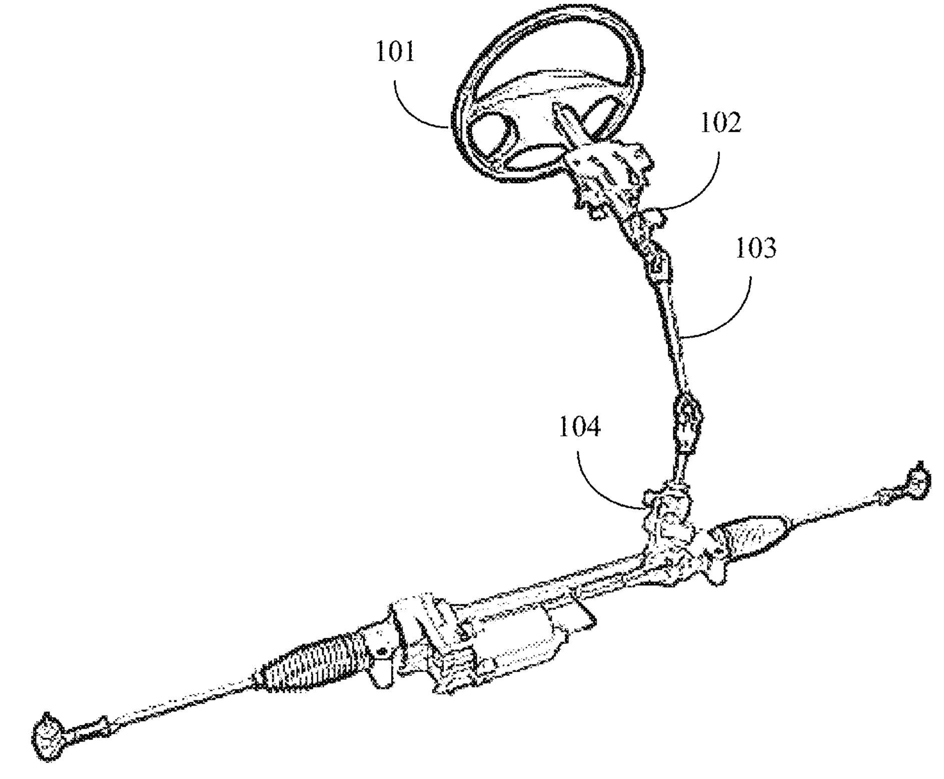
FIG. 1 is a schematic diagram of a structure of an electric power steering system.
Figure 2:
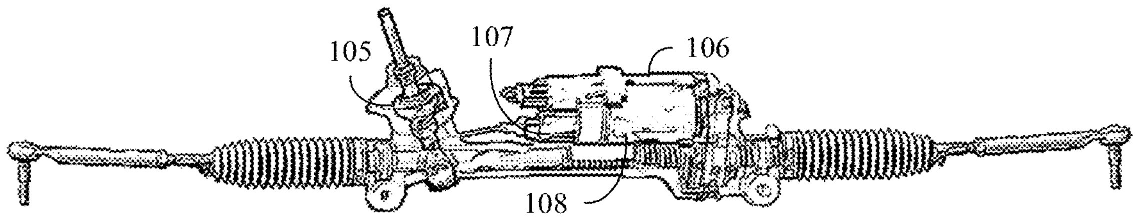
FIG. 2 is a schematic diagram of a structure of a steering gear.

In vehicle's structure, a power transmission system mounted between a steering wheel and vehicle wheels is referred to as a steering system. When the vehicle travels, the steering system is used to maintain or change a traveling direction of the vehicle. So far, the steering system has gone through four stages: a mechanical steering system, a hydraulic power steering system, an electro-hydraulic power steering system, and an electric power steering system. Currently, except for a few low-end vehicle products, a great majority of vehicles use the electric power steering system. FIG. 1 is a schematic diagram of a structure of an electric power steering system. As shown in FIG. 1, the electric power steering system includes a steering wheel 101, a steering column 102, an intermediate shaft 103, and a steering gear 104. The steering gear 104 is a most complex part of the steering system. As shown in FIG. 2, the steering gear 104 mainly includes a torque angle sensor (torque angle sensor, TAS) 105, a motor 106, an electronic control unit (electronic control unit, ECU) 107, and a motor position sensor (motor position sensor, MPS) 108. When the steering wheel 101 rotates, the torque angle sensor TAS 105 detects torque and rotation angle parameters of the steering wheel 101 that are transferred by using the steering column 102 and the intermediate shaft 103, and feeds back the detected parameters to the electronic control unit ECU 107. The electronic control unit ECU 107 drives the motor 106 to run based on the received parameters, to generate assistance for steering.

In the field of manual driving, an electric power steering system usually adopts a non-redundancy design, that is, includes only one electronic control unit ECU and one motor, and is powered by one power supply. When any node in the electric power steering system is faulty, the system can be shut down and completely replaced by manual operations in providing steering effort. However, with development of driving automation technologies, especially application of an advanced driving assistant system ADAS, the electric power steering system with the non-redundancy design cannot meet a safety requirement of vehicle traveling.

Currently, the National Highway Traffic Safety Administration (NHTSA) of the United States classifies autonomous driving into six levels. The six levels are as follows in ascending order.

L0: no automation configuration. A driver drives the vehicle by himself/herself, and there is no active safety configuration.

L1: Driver assistance. The vehicle has some functions to assist the driver in performing a specific task of lateral or longitudinal vehicle motion (but cannot complete complex tasks such as lane merging and overtaking at the same time). The driver is responsible for most of vehicle control.

L2: advanced driver assistance. The vehicle can assist the driver in performing lateral and longitudinal vehicle motion tasks (the vehicle can independently implement specific complex tasks). However, the driver needs to monitor the vehicle in real time to complete these tasks.

L3: autonomous driving in specific scenarios. With consent of a vehicle owner, an automated driving system can be fully involved in vehicle traveling. Certainly, the vehicle owner may override, at any time, an error that occurs when the vehicle travels with autonomous driving.

L4: High autonomous driving. All operations for the vehicle during traveling are implemented by the automated driving system. In an execution scenario, the vehicle does not have illogical performance (no error occurs) and does not need operational intervention of the vehicle owner.

L5: No matter whether in a specific execution scenario, the vehicle can reach a destination through autonomous driving without an operation of the vehicle owner.

L2, L3, and L4 are covered by the advanced driving assistant system ADAS.

It can be learned that starting from Level 3 (L3), all driving operations are completed by the automated driving system. This requires that the automated driving system should have high safety. When the automated driving system partially fails, Level 3 (L3) requires that the automated driving system can still work until the vehicle owner intervenes or the vehicle travels to a safe area, and Level 4 (L4) requires that the automated driving system can still work until the vehicle travels to the safe area. To meet the foregoing requirements, an actuator of the automated driving system, for example, the electric power steering system, needs to have redundancy, so that when a single-point fault occurs in the electric power steering system, the electric power steering system can continue to maintain some steering assistance, to enable the vehicle to continue to travel to the safe area. Based on analysis on different road conditions, to meet a requirement of Level 3 (L3), a redundancy capability of the electric power steering system needs to reach 50%, that is, the electric power steering system can continue to maintain 50% of the steering assistance when the single-point fault occurs. To meet a requirement of Level 4 (L4), the redundancy capability of the electric power steering system needs to reach 75%, that is, the electric power steering system can continue to maintain 75% of the steering assistance when the single-point fault occurs.

Figure 3:
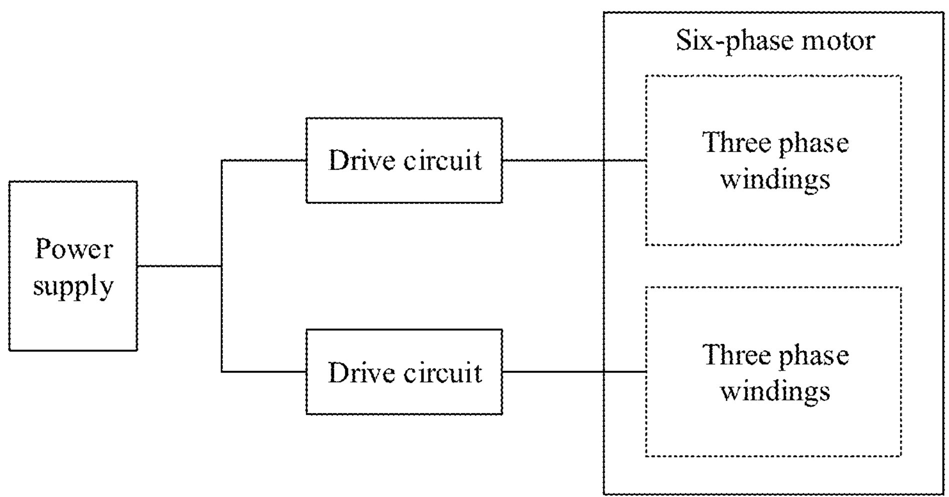
FIG. 3 is a schematic diagram of driving logic of an electric power steering system.

FIG. 3 is a schematic diagram of driving logic of an electric power steering system. As shown in FIG. 3, the electric power steering system includes a six-phase motor and two drive circuits. Each drive circuit is configured to control three phase windings in the six-phase motor, and the two drive circuits share one power supply to be powered. When a single-point fault occurs in one of the drive circuits or the three phase windings in the six-phase motor, the electric power steering system loses half of steering assistance, but can provide steering assistance by using the drive circuit that is not faulty or the other three phase windings that are not faulty in the six-phase motor. Therefore, a maximum of 50% of the steering assistance can be provided, which cannot meet a redundancy capability requirement of Level 4 (L4).

Figure 4:
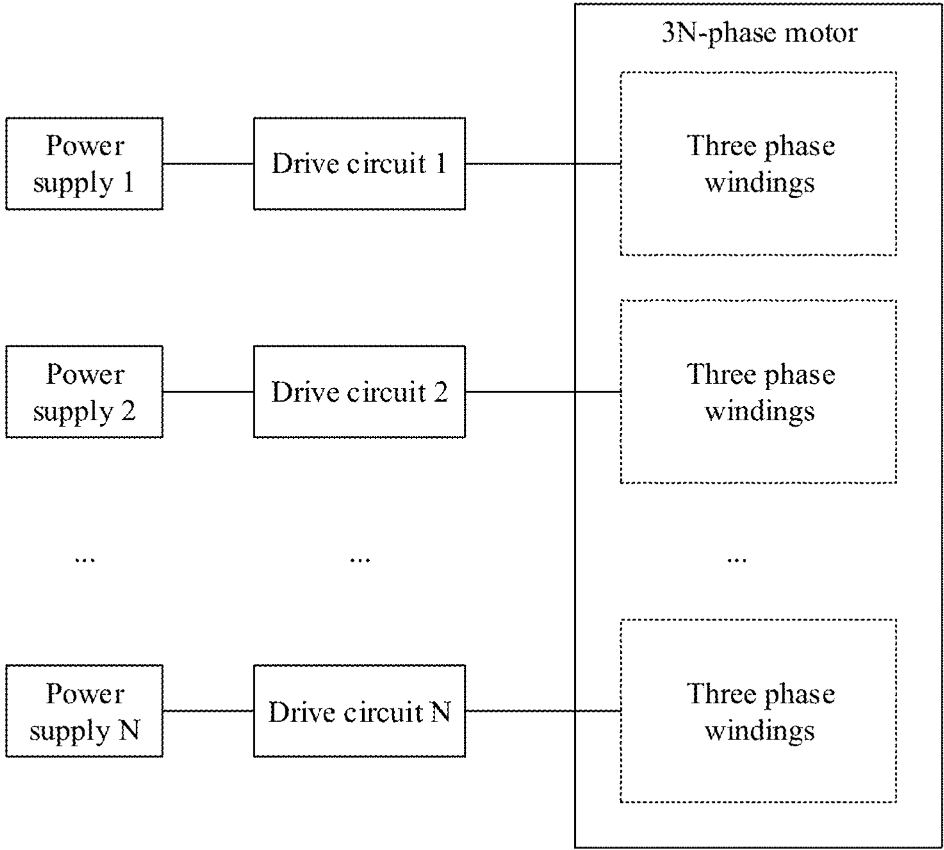
FIG. 4 is a schematic diagram of driving logic of another electric power steering system.

FIG. 4 is a schematic diagram of driving logic of another electric power steering system. As shown in FIG. 4, the electric power system includes a 3N (N is a positive integer greater than or equal to 2)-phase motor, N drive circuits, and N independent power supplies. Each drive circuit is configured to control three phase windings in the 3N-phase motor, and each drive circuit is powered by one single power supply. When a single-point fault occurs in one drive circuit, three phase windings in the 3N-phase motor, or one power supply, the electric power steering system loses 1/N of steering assistance, but can provide steering assistance by using N−1 drive circuits that are not faulty, 3(N−1)-phase windings that are not faulty in the 3N-phase motor, or N−1 power supplies that are not faulty. Therefore, a maximum of (N−1)/N of the steering assistance can be provided. It can be learned that, if the electric power steering system shown in FIG. 4 meets the requirement of Level 4 (L4), a 12-phase motor, four drive circuits, and four independent power supplies are needed. In this case, a system structure and control logic are highly complex, a large quantity of nodes may be faulty, and a large quantity of independent power supplies are needed for an entire vehicle, which is unfavorable to implementation.

An embodiment of this application provides an electric power steering apparatus, which can meet a redundancy capability requirement of Level 4 (L4), has a simple structure, and is easy to implement.

Figure 5:
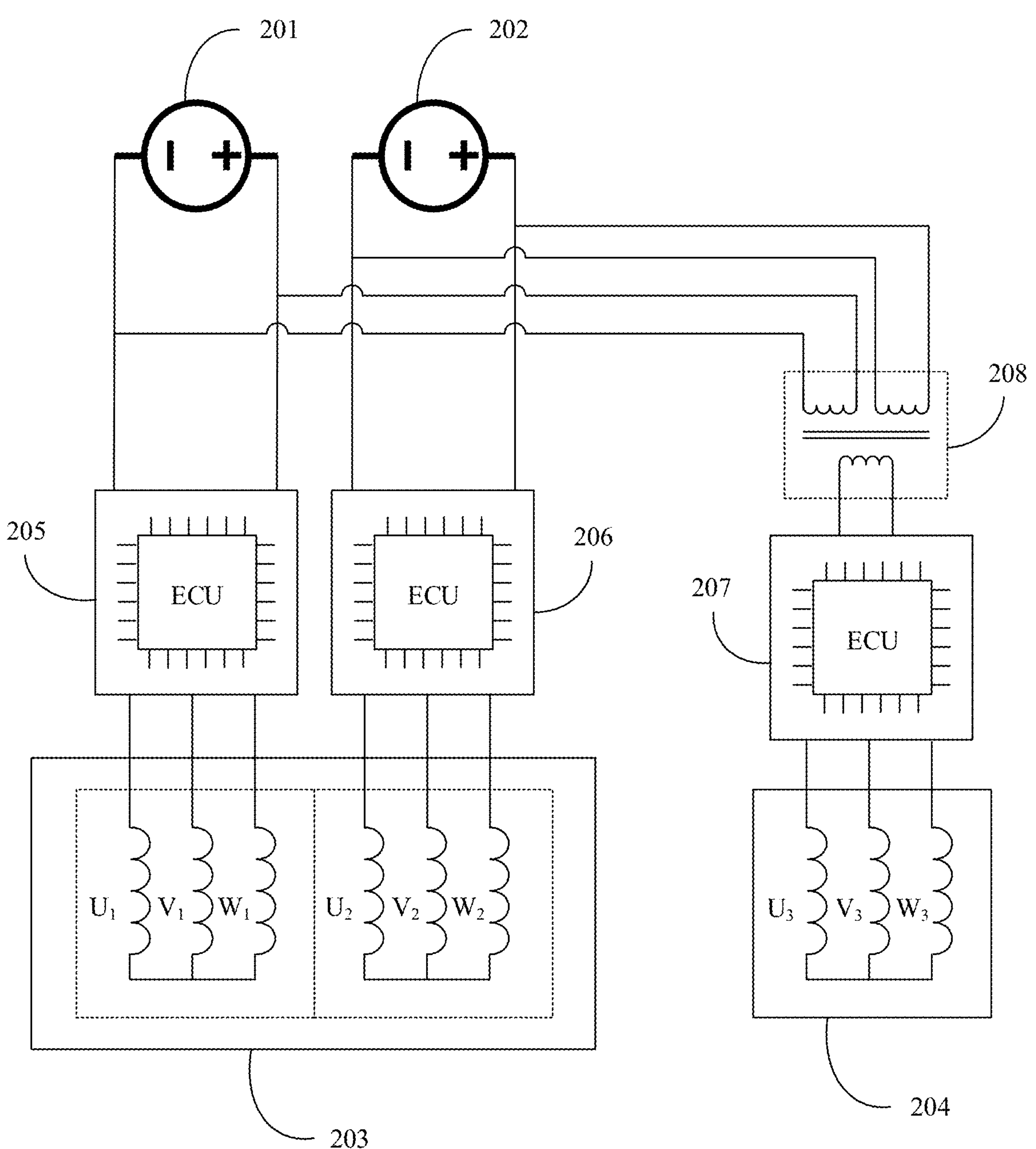
FIG. 5 is a schematic diagram of driving logic of an electric power steering apparatus according to an embodiment of this application.

FIG. 5 is a schematic diagram of driving logic of an electric power steering apparatus according to an embodiment of this application. As shown in FIG. 5, the electric power steering apparatus includes a first power supply 201, a second power supply 202, a first motor 203, and a second motor 204. The first motor 203 is coupled to the first power supply 201 and the second power supply 202, and is powered by the first power supply 201 and the second power supply 202. The first motor 203 can provide steering assistance corresponding to rotation of a steering wheel through being driven by the first power supply 201 and/or the second power supply 202. Each of the first power supply 201 and the second power supply 202 drives the first motor 203 to generate a part of the steering assistance. The first power supply 201 and the second power supply 202 are coupled into one power supply, and then are coupled to the second motor 204, to drive the second motor 204. When the first motor 203 loses a part of the steering assistance, the second motor 204 can provide additional steering assistance corresponding to the rotation of the steering wheel. The additional steering assistance includes at least a part of the part of the steering assistance lost by the first motor 203.

Further, as shown in FIG. 5, the electric power steering apparatus further includes a first control unit 205, a second control unit 206, and a third control unit 207. The first control unit 205, the second control unit 206, and the third control unit 207 all may be, for example, independent electronic control units ECUs. The first control unit 205 is coupled to the first power supply 201 and a part of windings of the first motor 203, and can drive the first motor 203 by using the first power supply 201, to enable the first motor 203 to provide a part of the steering assistance corresponding to the rotation of the steering wheel. The second control unit 206 is coupled to the second power supply 202 and another part of the windings of the first motor 203 that are not coupled to the first control unit 205, and can drive the first motor 203 by using the second power supply 202, to enable the first motor 203 to provide another part of the steering assistance corresponding to the rotation of the steering wheel. The third control unit 207 is coupled to the first power supply 201 and the second power supply 202 by using an isolated power supply unit 208. The isolated power supply unit 208 can couple the first power supply 201 and the second power supply 202 into one power supply and output the power supply to the third control unit 207, so that the third control unit 207 can use the power supply coupled by the isolated power supply unit 208 to drive the second motor 204 to generate the additional steering assistance corresponding to the rotation of the steering wheel.

In a specific implementation, the first motor 203 may be a six-phase motor, and includes six phase windings, for example, $U_1$, $V_1$, $W_1$, $U_2$, $V_2$, and $W_2$. The first control unit 205 is configured to be coupled to three of the six phase windings of the first motor 203, for example, $U_1$, $V_1$, and $W_1$, and output the first power supply 201 to the three phase windings, to enable the first motor 203 to generate 50% of the steering assistance. The first control unit 205 is configured to be coupled to the other three of the six phase windings of the first motor 203, for example, $U_2$, $V_2$, and $W_2$, and output the second power supply 202 to the three phase windings, to enable the first motor 203 to generate another 50% of the steering assistance. It can be learned that when neither the first control unit 205 nor the second control unit 206 is faulty (for example, both the first control unit 205 and the second control unit 206 can normally drive the first motor 203), and neither the first power supply 201 nor the second power supply 202 is faulty, both the first control unit 205 and the second control unit 206 are used to drive the first motor 203, to enable the first motor 203 to provide 100% of the steering assistance.

In a specific implementation, the second motor 204 may be a three-phase motor, and includes three phase windings, for example, $U_3$, $V_3$, and $W_3$. The third control unit 207 is configured to be coupled to the three phase windings $U_3$, $V_3$, and $W_3$ of the second motor 204, and output the power supply that is obtained after the first power supply 201 and the second power supply 202 are coupled to the three phase windings, to enable the second motor 204 to generate additional at least 25% of the steering assistance.

In this embodiment of this application, the first power supply 201 and the second power supply 202 may be power supplies having a same power supply capability, for example, having a same rated voltage, and can provide a same rated current.

Figure 6:
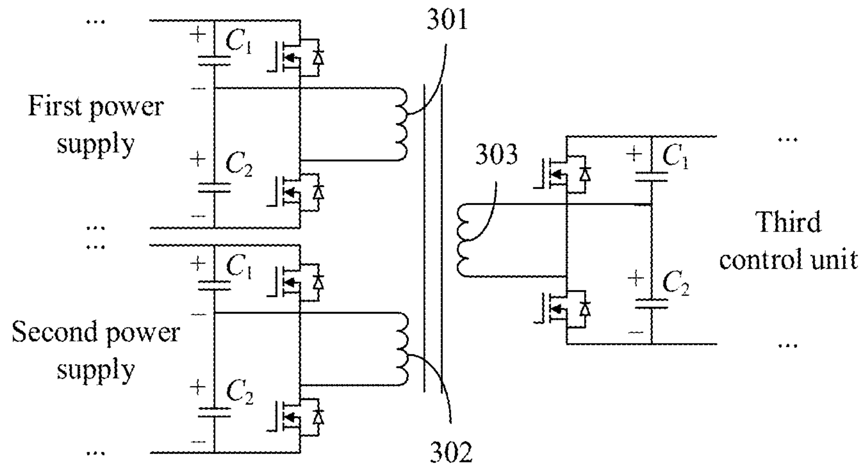
FIG. 6 is a schematic diagram of a structure of an isolated power supply unit according to an embodiment of this application.

FIG. 6 is a schematic diagram of a structure of an isolated power supply unit 208 according to an embodiment of this application. As shown in FIG. 6, a primary side (input side) of the isolated power supply unit 208 includes a first winding 301 and a second winding 302, and a secondary side (output side) includes a third winding 303. The first winding 301 is coupled to the first power supply 201 by using an isolating circuit, the second winding is coupled to the second power supply 202 by using an isolating circuit, and the third winding 303 is coupled to the third control unit 207 by using an isolating circuit. In this way, the isolated power supply unit 208 couples the first power supply 201 and the second power supply 202 that are input from the primary side into one power supply that is output from the secondary side, and connects the power supply to the third control unit 207. Therefore, the third control unit 207 can drive the second motor 204 by using the coupled power supply.

In this embodiment of this application, the steering assistance may be, for example, output torque of a motor, and is measured in Nm (Nm). It may be understood that vehicles of different weights and different types have different requirements on output torque of the motor of the electric power steering apparatus, and this may be used as a basis for selecting the first motor 203 and the second motor 204. For example, a five-seat small passenger vehicle requires that an electric power steering apparatus can provide a maximum of 8 Nm steering assistance (that is, 100% of steering assistance is 8 Nm). In this case, a motor whose maximum output torque is not less than 8 Nm may be selected as the first motor 203, to provide 100% of the steering assistance. In addition, a motor whose maximum output torque is not less than 2 Nm may be selected as the second motor 204, to provide additional at least 25% of the steering assistance. It may be understood that in this embodiment of this application, the first motor 203 is a primary motor, and the second motor 204 is a secondary motor.

When the electric power steering apparatus is not faulty, the first control unit 205 and the second control unit 206 drive all the six phase windings of the first motor 203, so that the first motor 203 can provide 100% of the steering assistance. In this case, the second motor 204 does not need to be started.

When a single-point fault occurs in the electric power steering apparatus, for example, either the first control unit 205 or the second control unit 206 cannot normally drive the first motor 203, and only three phase windings of the first motor 203 are driven. As a result, the first motor 203 can provide only 50% of the steering assistance. For another example, when either the first power supply 201 or the second power supply 202 is faulty, one of the first control unit 205 and the second control unit 206 that is coupled to the faulty power supply loses a function, and only three phase windings of the first motor 203 can be driven. Consequently, the first motor 203 can provide only 50% of the steering assistance. In this case, the third control unit 207 can drive the second motor 204, to enable the second motor 204 to provide additional at least 25% of the steering assistance. In this way, the electric power steering apparatus can provide at least 75% of the steering assistance, to meet the redundancy capability requirement of Level 4 (L4). In addition, the electric power steering apparatus provided in this embodiment of this application has only nine motor phases in total, with low control logic complexity and a simple structure easy for implementation.

Figure 7:
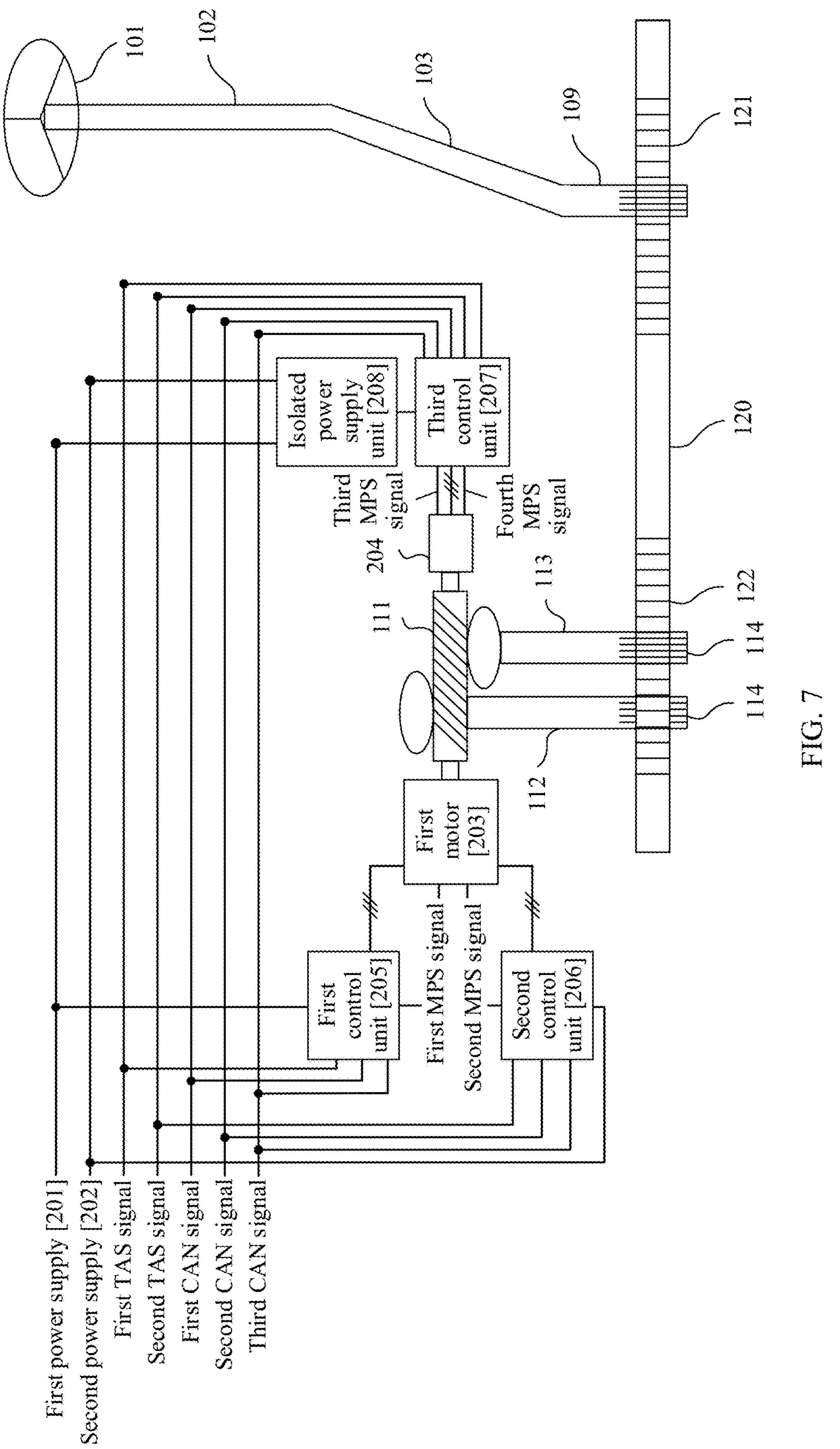
FIG. 7 is a schematic diagram of a structure of an electric power steering apparatus according to an embodiment of this application.

FIG. 7 is a schematic diagram of a structure of an electric power steering apparatus according to an embodiment of this application. The electric power steering apparatus is configured to implement the driving logic of the electric power steering apparatus shown in FIG. 5. As shown in FIG. 7, the electric power steering apparatus includes: a steering wheel 101, a steering column 102 connected to the steering wheel 101, an intermediate shaft 103 connected to the steering column 102, a gear shaft 109 connected to the intermediate shaft 103, a first motor 203, a second motor 204, a worm 111 that is driven to rotate by the first motor 203 and/or the second motor 204, a first turbine shaft 112 and a second turbine shaft 113 that are engaged with the worm 111, and a cross lever 120 having a first rack 121 and a second rack 122. The intermediate shaft 103 is provided with a gear 114, and is engaged with the first rack 121 of the cross lever 120 by using the gear 114. The first turbine shaft 112 and the second turbine shaft 113 are also provided with gears, and are engaged with the second rack 122 of the cross lever 120 by using the gears.

According to the structure shown in FIG. 7, on one hand, when a vehicle owner rotates the steering wheel 101, the rotation is transferred to the gear shaft 109 by using the steering column 102 and the intermediate shaft 103. The gear shaft 109 is engaged with the cross lever 120 by using the gear and the rack, to convert the rotation of the steering wheel 101 into an axial displacement of the cross lever 120. Two ends of the cross lever 120 are usually connected to knuckles of vehicle wheels of a vehicle. When the cross lever 120 generates the axial displacement, the knuckles can be pulled to generate torque, to implement vehicle wheel steering. On another side, when the vehicle owner rotates the steering wheel 101, a first control unit 205, a second control unit 206, and/or a third control unit 207 can drive the first motor 203 and/or the second motor 204 based on torque and a rotation angle of the steering wheel 101, to enable the worm 111 to rotate. The first turbine shaft 112 and the second turbine shaft 113 also rotate correspondingly under drive of the worm 111, and the first turbine shaft 112 and the second turbine shaft 113 are engaged with the cross lever 120 by using the gears and the rack, to drive the cross lever 120 to generate the axial displacement to provide assistance for vehicle wheel steering.

In some embodiments, torque and rotation angle parameters of the steering wheel 101 may be measured by using a torque angle sensor TAS. As shown in FIG. 7, in this embodiment of this application, output signals of the torque angle sensor TAS are divided into two signals, for example, a first TAS signal and a second TAS signal. The first TAS signal is output to the first control unit 205, and the second TAS signal is output to the second control unit 206.

In some embodiments, each of the first motor 203 and the second motor 204 is provided with a motor position sensor MPS. As shown in FIG. 7, in this embodiment of this application, output signals of the motor position sensor MPS disposed on the first motor 203 are divided into two signals, for example, a first MPS signal and a second MPS signal. Output signals of the motor position sensor MPS disposed on the second motor 204 are also divided into two signals, for example, a third MPS signal and a fourth MPS signal. The first MPS signal is output to the first control unit 205, the second MPS signal is output to the second control unit 206, and the third MPS signal and the fourth MPS signal are output to the third control unit 207.

In some embodiments, the first control unit 205, the second control unit 206, and the third control unit 207 may communicate with one another, or communicate with an industrial computer or another electronic device of a vehicle by using a controller area network (controller area network, CAN). The controller area network CAN is a feature-enriched vehicular bus standard that allows single-chip microcomputers and instruments on a network to communicate with each other without a host. The controller area network CAN is based on a message transmission protocol and uses a multiplexing communication cable, to reduce usage of copper cables. The CAN has been then used by other industries. The CAN is based on the broadcast communication mechanism (broadcast communication mechanism) of message-oriented transmission protocol. According to content of a message, a message identifier (message identifier) is used to define the priority of the content and the message for transmission, instead of assigning a specific station address (station address). Each identifier is unique in the entire network. Therefore, the CAN has a good flexible adjustment capability that a node can be added to an existing network without adjusting software and hardware. In addition, a CAN message is not transmitted based on a special type of nodes, which facilitates network upgrade.

In some embodiments, in this embodiment of this application, communication signals of the controller area network CAN are divided into three CAN signals. For ease of description, the three signals are respectively referred to as a first CAN signal, a second CAN signal, and a third CAN signal herein. The first control unit 205 is coupled to the first CAN signal and the third CAN signal, the second control unit 206 is coupled to the second CAN signal and the third CAN signal, and the third control unit 207 is coupled to the first CAN signal, the second CAN signal, and the third CAN signal.

In some embodiments, in this embodiment of this application, the first CAN signal and the second CAN signal may be used by the electric power steering apparatus to communicate with another device of the vehicle. For example, the first control unit 205 may communicate with the industrial computer of the vehicle by using the first CAN signal, and the second control unit 206 may communicate with the industrial computer of the vehicle by using the second CAN signal. In this embodiment of this application, the third CAN signal may be applied to internal communication of the electric power steering apparatus. For example, the first control unit 205 and the second control unit 206 may communicate by using the third CAN signal, the first control unit 205 and the third control unit 207 may communicate by using the third CAN signal, and the second control unit 206 and the third control unit 207 may communicate by using the third CAN signal.

Figure 8:
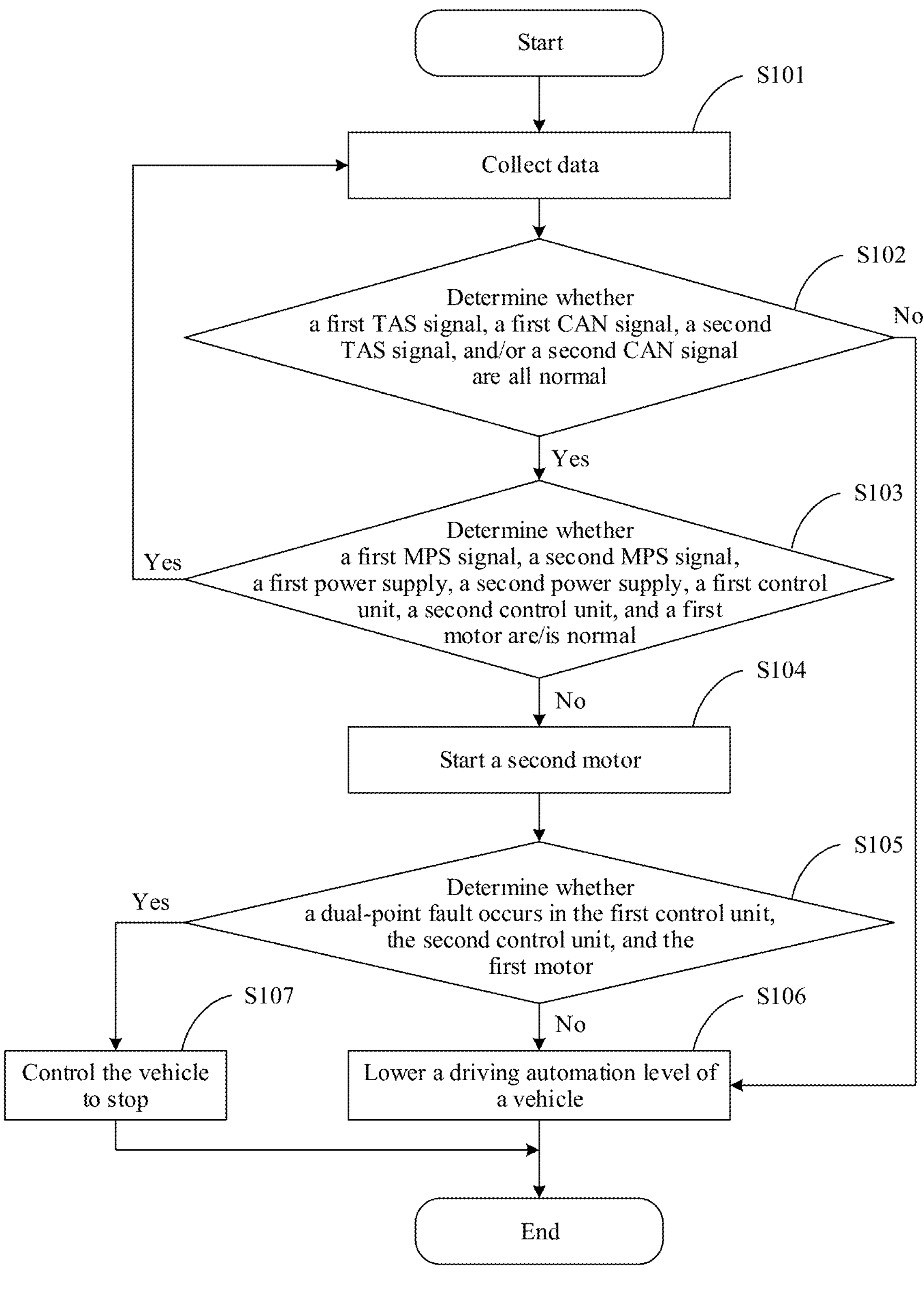
FIG. 8 shows a control process of an electric power steering apparatus according to an embodiment of this application.

According to the structure shown in FIG. 7, an embodiment of this application provides a control process of an electric power steering apparatus. As shown in FIG. 8, the control process includes the following steps.

Step S101: Collect data.

In specific implementation, the data that needs to be collected may include data such as the first TAS signal, the first CAN signal, the second TAS signal, the second CAN signal, the first MPS signal, the second MPS signal, a voltage and a current of a first power supply 201, and a voltage and a current of a second power supply 202.

The first TAS signal, the first CAN signal, the first MPS signal, and the voltage and the current of the first power supply 201 may be obtained by the first control unit 205, and the second TAS signal, the second CAN signal, the second MPS signal, and the voltage and the current of the second power supply 202 may be obtained by the second control unit 206.

In addition, a current sensor may be disposed inside each of the first control unit 205 and the second control unit 206. The current sensor is configured to detect a current input to windings of the first motor 203. For example, the current sensor disposed inside the first control unit 205 may detect a current $I_1$ input to three phase windings ($U_1$, $V_1$, and $W_0$ of the first motor 203, and the current sensor disposed inside the second control unit 206 may detect a current $I_2$ input to the other three phase windings ($U_2$, $V_2$, and $W_2$) of the first motor 203.

Step S102: Determine whether the first TAS signal, the first CAN signal, the second TAS signal, and/or the second CAN signal are/is all normal. Perform step S103 if the first TAS signal, the first CAN signal, the second TAS signal, and/or the second CAN signal are all normal; or perform step S106 if at least one of the first TAS signal, the first CAN signal, the second TAS signal, and/or the second CAN signal is faulty.

In specific implementation, whether each TAS signal is normal may be determined by a multi-channel signal check. The multi-channel signal check may be completed by the first control unit 205, or may be completed by the second control unit 206. In addition, whether a CAN signal is normal may be determined by checking cyclic redundancy check (cyclic redundancy check, CRC) bits in a data packet of the CAN signal and a rolling counter (rolling counter) added to a data field (data field). Detailed descriptions are as follows.

In an implementation, the first TAS signal and the second TAS signal may be checked by the first control unit 205. The second control unit 206 may send the second TAS signal obtained by the second control unit 206 to the first control unit 205 through CAN communication. The first control unit 205 checks the first TAS signal and the second TAS signal by using a preset check algorithm, for example, synchronization check, cross-correlation check, or value check, and then, determines whether both the first TAS signal and the second TAS signal are normal signals based on check results.

For example, when the synchronization check is performed, if the first TAS signal and the second TAS signal meet a specific synchronization requirement, it indicates that both the signals are normal; or if the first TAS signal and the second TAS signal do not meet the synchronization requirement, it indicates that at least one of the two signals is faulty.

For example, when the cross-correlation check is performed, if the first TAS signal and the second TAS signal meet a specific cross-correlation requirement, it indicates that both the signals are normal; or if the first TAS signal and the second TAS signal do not meet the cross-correlation requirement, it indicates that at least one of the two signals is faulty.

In an implementation, the first TAS signal and the second TAS signal may be alternatively checked by the second control unit 206. The first control unit 205 may send the first TAS signal obtained by the first control unit 205 to the second control unit 206 through CAN communication. The second control unit 206 checks the first TAS signal and the second TAS signal by using a preset check algorithm, and determines whether both the first TAS signal and the second TAS signal are normal signals based on check results. For a specific check method, refer to the foregoing examples. Details are not described herein again.

It should be understood that the foregoing method for checking the first TAS signal and the second TAS signal is merely a part rather than all of embodiments used herein in this application. A person skilled in the art may further use another feasible check algorithm to check the first TAS signal and the second TAS signal, to determine whether the two signals are normal. This does not go beyond the protection scope of embodiments of this application.

In an implementation, the first control unit 205 may determine whether the first CAN signal is normal by checking CRC bits in a data packet of the first CAN signal. Similarly, the second control unit 206 may also determine whether the second CAN signal is normal by checking CRC bits in a data packet of the second CAN signal.

Figure 9:
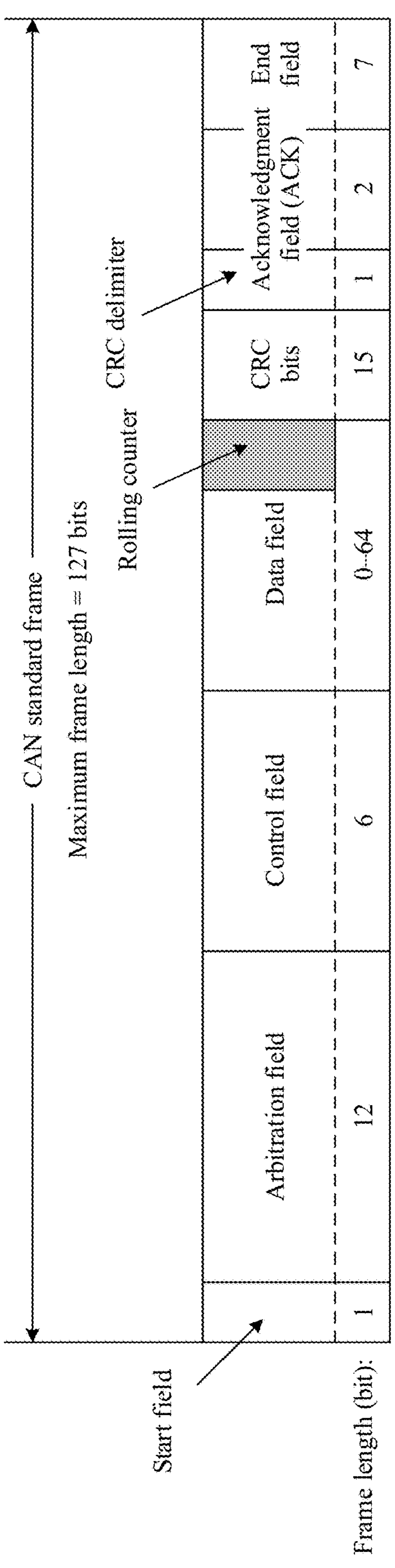
FIG. 9 is a schematic diagram of a format of a data packet of a CAN signal.

FIG. 9 is a schematic diagram of a format of a data packet of a CAN signal. As shown in FIG. 9, a CAN packet includes CRC bits with a length of 15 bytes, and a rolling counter (rolling counter) is further configured in a data field of the CAN packet. The rolling counter (rolling counter) performs rolling counting along with accumulation of data packets sent by a transmit end. In CAN communication, a packet transmit end adds a frame check sequence (frame check sequence, FCS) at the end of a packet to ensure that a message is correct. A packet receive end recalculates an FCS based on a received packet (including a value of the rolling counter) and compares the recalculated FCS with a received FCS. If the recalculated FCS and the received FCS are inconsistent, it indicates that a CRC error occurs, and a CAN signal is faulty. If the recalculated FCS and the received FCS are consistent, it indicates that the CAN signal is normal.

Step S103: Determine whether the first MPS signal, the second MPS signal, the first power supply 201, the second power supply 202, the first control unit 205, the second control unit 206, and the first motor 203 are normal. Go back to step S101 if the first MPS signal, the second MPS signal, the first power supply 201, the second power supply 202, the first control unit 205, the second control unit 206, and the first motor 203 are all normal; or perform step S104 if at least one of the first MPS signal, the second MPS signal, the first power supply 201, the second power supply 202, the first control unit 205, the second control unit 206, and the first motor 203 is faulty.

In specific implementation, whether each MPS signal is normal may be determined by the multi-channel signal check. The multi-channel signal check may be completed by the first control unit 205, or may be completed by the second control unit 206. In addition, whether the first power supply 201 and the second power supply 202 are normal may be determined by detecting a supply voltage of a power supply. In addition, the first control unit 205 and the second control unit 206 may determine whether the first control unit 205 and the second control unit 206 are normal by a chip self-test, or determine whether the first control unit 205 and the second control unit 206 are normal by mutual communication through the CAN. In addition, whether the first motor 203 is normal may be further determined by detecting an input current of the windings of the first motor 203 and with reference to a corresponding MPS signal (namely, a rotor position). Detailed descriptions are as follows.

In an implementation, the first MPS signal and the second MPS signal may be checked by the first control unit 205. The second control unit 206 may send the second MPS signal obtained by the second control unit 206 to the first control unit 205 through CAN communication. The first control unit 205 checks the first MPS signal and the second MPS signal by using a preset check algorithm, for example, synchronization check, cross-correlation check, or value check, and then, determines whether both the first MPS signal and the second MPS signal are normal signals based on check results.

For example, when the synchronization check is performed, if the first MPS signal and the second MPS signal meet a specific synchronization requirement, it indicates that both the signals are normal; or if the first MPS signal and the second MPS signal do not meet the synchronization requirement, it indicates that at least one of the two signals is faulty.

For example, when the cross-correlation check is performed, if the first MPS signal and the second MPS signal meet a specific cross-correlation requirement, it indicates that both the signals are normal; or if the first MPS signal and the second MPS signal do not meet the cross-correlation requirement, it indicates that at least one of the two signals is faulty.

It should be understood that the foregoing method for checking the first MPS signal and the second MPS signal is merely a part rather than all of embodiments used herein in this application. A person skilled in the art may further use another feasible check algorithm to check the first MPS signal and the second MPS signal, to determine whether the two signals are normal. This does not go beyond the protection scope of embodiments of this application.

In an implementation, a voltage sensor may be disposed in each of the first control unit 205 and the second control unit 206. The first control unit 205 may obtain a supply voltage $V_{cc1}$ of the first power supply 201 by using the voltage sensor. If the supply voltage $V_{cc1}$ is less than a minimum threshold $V_{min1}$ or is greater than a maximum threshold $V_{max1}$, it indicates that the first power supply 201 is faulty. Similarly, the second control unit 206 may obtain a supply voltage $V_{cc2}$ of the second power supply 202 by using the voltage sensor. If the supply voltage $V_{cc2}$ is less than a minimum threshold $V_{min2}$ or is greater than a maximum threshold $V_{max2}$, it indicates that the second power supply 202 is faulty. The first power supply 201 and the second power supply 202 may be power supplies with a same rated output voltage, or may be different power supplies. When the first power supply 201 and the second power supply 202 are same power supplies, $V_{min}=V_{min1}=V_{min2}$, and $V_{max}=V_{max1}=V_{max2}$. For example, when the rated output voltage of the first power supply 201 is 12 V, $V_{max}$ may be, for example, 13 V, and $V_{min}$ may be, for example, 11 V. In this case, when the supply voltage $V_{cc1}$ is greater than 13 V or less than 11 V, it indicates that the first power supply 201 is faulty.

In an implementation, both the first control unit 205 and the second control unit 206 may determine whether the first control unit 205 and the second control unit 206 are normal by using a chip detection mechanism. When a control unit detects a fault or that the control unit is faulty, the control unit can generate a corresponding trouble code (diagnose trouble code, DTC), and send the trouble code to another control unit and the industrial computer of the vehicle through CAN communication, to enable the another control unit and/or the industrial computer to perform a corresponding operation. For example, if the first control unit 205 detects that the first control unit 205 is faulty, the first control unit 205 sends a corresponding trouble code to the second control unit 206, the third control unit 207, and the industrial computer, and the second control unit 206, the third control unit 207, and/or the industrial computer perform/performs a response operation.

In an implementation, as shown in FIG. 10, the first control unit 205 may communicate with the second control unit 206 by using the third CAN signal, to determine whether the second control unit 206 is normal. For example, the first control unit 205 may send an instruction for requesting a response to the second control unit 206 by using the third CAN signal, and detect whether the response is received from the second control unit 206. If the response from the second control unit 206 is received, it indicates that the second control unit 206 is normal. If no response from the second control unit 206 is received, it indicates that the second control unit 206 is faulty. When it is detected that the second control unit 206 is faulty, the first control unit 205 may send fault information to the third control unit 207 and the industrial computer, to enable the third control unit 207 and/or the controller to perform a corresponding operation.

Figure 11:
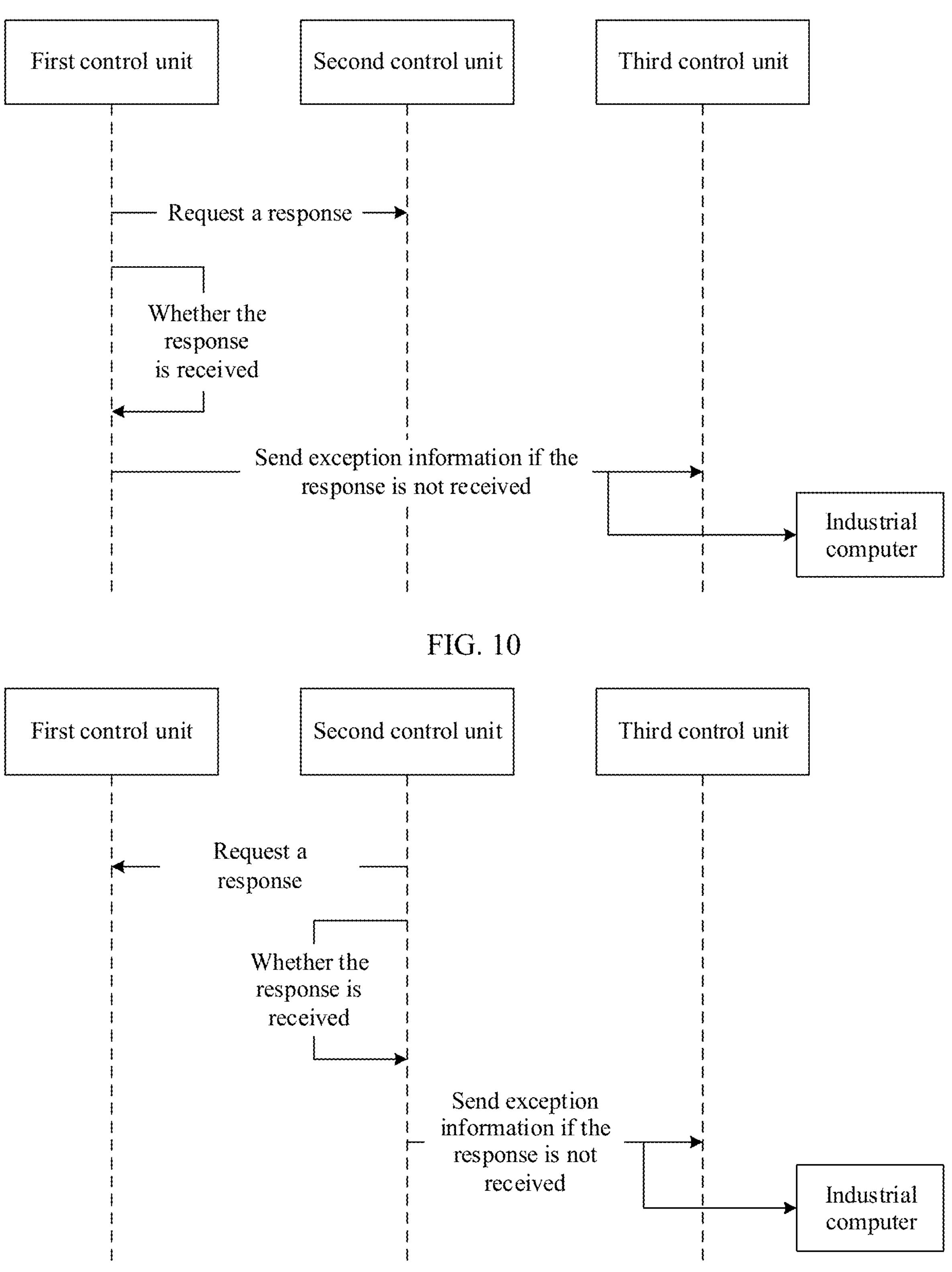
FIG. 11 is a detection flowchart in which a second control unit detects whether a first control unit is normal.

In an implementation, as shown in FIG. 11, the second control unit 206 may communicate with the first control unit 205 by using the third CAN signal, to determine whether the first control unit 205 is normal. For example, the second control unit 206 may send an instruction for requesting a response to the first control unit 205 by using the third CAN signal, and detect whether the response is received from the first control unit 205. If the response from the first control unit 205 is received, it indicates that the first control unit 205 is normal. If no response from the first control unit 205 is received, it indicates that the first control unit 205 is faulty. When it is detected that the first control unit 205 is faulty, the second control unit 206 may send fault information to the third control unit 207 and the industrial computer, to enable the third control unit 207 and/or the controller to perform a corresponding operation.

Figures 12, 13:
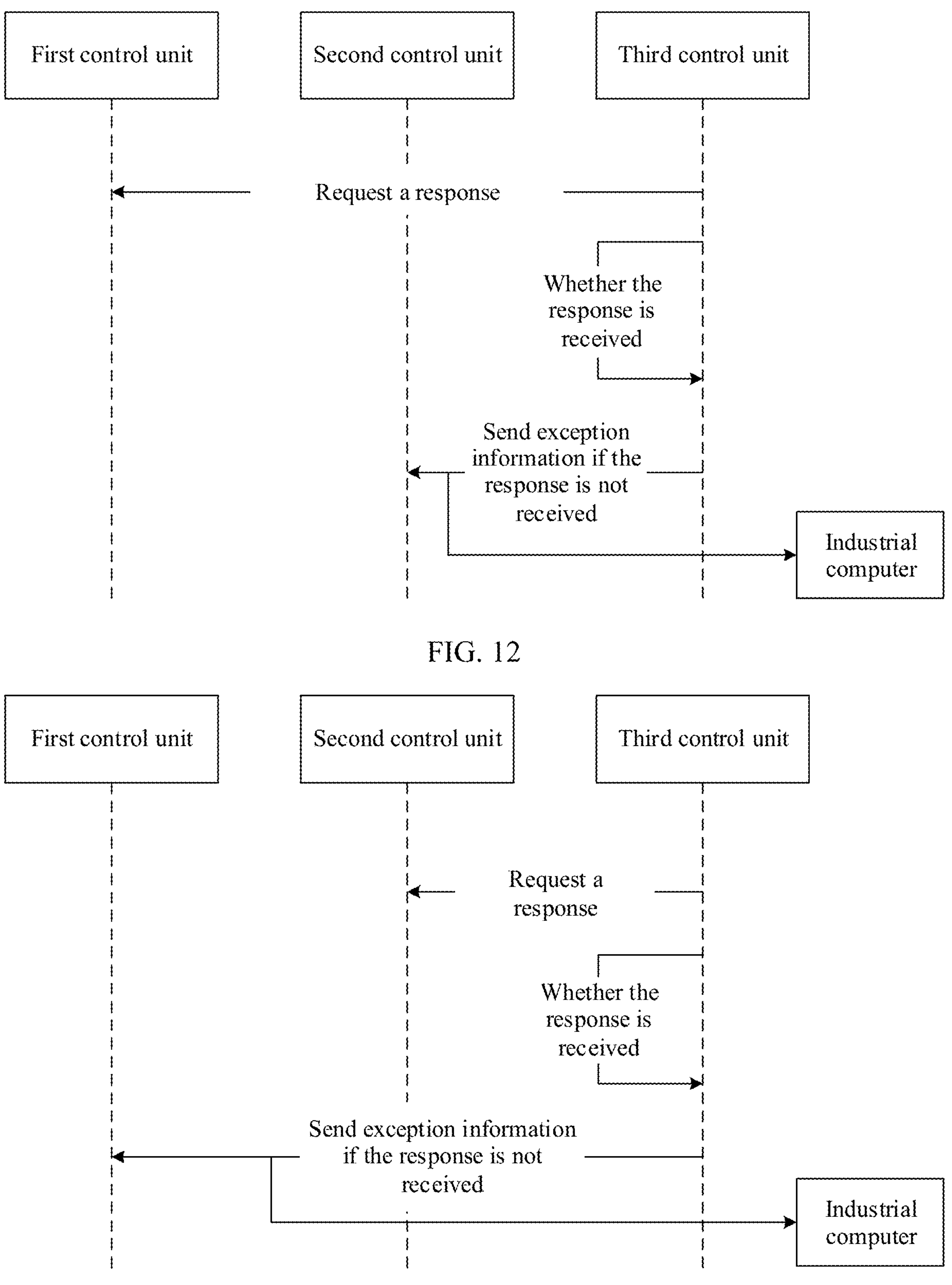
FIG. 12 is a detection flowchart in which a third control unit detects whether a first control unit is normal.
FIG. 13 is a detection flowchart in which a third control unit detects whether a second control unit is normal.

In an implementation, as shown in FIG. 12, the third control unit 207 may communicate with the first control unit 205 by using the third CAN signal, to determine whether the first control unit 205 is normal. For example, the third control unit 207 may send an instruction for requesting a response to the first control unit 205 by using the third CAN signal, and detect whether the response is received from the first control unit 205. If the response from the first control unit 205 is received, it indicates that the first control unit 205 is normal. If no response from the first control unit 205 is received, it indicates that the first control unit 205 is faulty. When it is detected that the first control unit 205 is faulty, the third control unit 207 may send fault information to the second control unit 206 and the industrial computer, to enable the second control unit 206 and/or the controller to perform a corresponding operation.

In an implementation, as shown in FIG. 13, the third control unit 207 may communicate with the second control unit 206 by using the third CAN signal, to determine whether the second control unit 206 is normal. For example, the third control unit 207 may send an instruction for requesting a response to the second control unit 206 by using the third CAN signal, and detect whether the response is received from the second control unit 206. If the response from the second control unit 206 is received, it indicates that the second control unit 206 is normal. If no response from the second control unit 206 is received, it indicates that the second control unit 206 is faulty. When it is detected that the second control unit 206 is faulty, the third control unit 207 may send fault information to the first control unit 205 and the industrial computer, to enable the second control unit 206 and/or the controller to perform a corresponding operation.

In an implementation, the current sensor is disposed in the first control unit 205, and may be configured to detect the input current $I_1$ of the three phase windings ($U_1$, $V_1$, and $W_1$) of the first motor 203. The first control unit 205 may determine whether the first motor 203 is normal based on the input current $I_1$ and/or the first MPS signal. For example, when the input current $I_1$ is continuously higher than a rated current $I_0$ (for example, when the input current $I_1$ is continuously higher than the rated current $I_0$ for several seconds, and is clearly not an instantaneous current of startup), it may be considered that the three phase windings ($U_1$, $V_1$, and $W_1$) of the first motor 203 are overloaded or short-circuited. For another example, when the first control unit 205 drives the first motor 203 to rotate, but the input current $I_1$ is clearly lower than the rated current $I_0$ (for example, when the input current $I_0$ is equal to 0 A or close to 0 A), it may be considered that the three phase windings ($U_1$, $V_1$, and $W_1$) of the first motor 203 are open-circuited. For another example, when the input current $I_1$ is normal, but the first MPS signal indicates that a rotor of the first motor 203 does not rotate, it indicates that the rotor of the first motor 203 is faulty.

In an implementation, the current sensor is disposed in the second control unit 206, and may be configured to detect the input current $I_2$ of the other three phase windings ($U_2$, $V_2$, and $W_2$) of the first motor 203. The second control unit 206 may determine whether the first motor 203 is normal based on the input current $I_2$ and/or the second MPS signal. For example, when the input current $I_2$ is continuously higher than the rated current $I_0$, it may be considered that the three phase windings ($U_2$, $V_2$, and $W_2$) of the first motor 203 are overloaded or short-circuited. For another example, when the second control unit 206 drives the first motor 203 to rotate, but the input current $I_2$ is clearly lower than the rated current $I_0$, it may be considered that the three phase windings ($U_2$, $V_2$, and $W_2$) of the first motor 203 are open-circuited. For another example, when the input current $I_2$ is normal, but the second MPS signal indicates that the rotor of the first motor 203 does not rotate, it indicates that the rotor of the first motor 203 is faulty.

Step S104: Start the second motor 204, and then perform step S105.

In specific implementation, the third control unit may be configured to start the second motor 204.

Step S105: Determine whether a dual-point fault occurs in the first control unit 205, the second control unit 206, and the first motor 203. Perform step S107 if the dual-point fault occurs, or perform step S106 if the dual-point fault does not occur.

Step S106: Lower an autonomous driving level of the vehicle.

Step S107: Control the vehicle to stop.

In this embodiment of this application, the dual-point fault means that at least two points of the first control unit 205, the second control unit 206, the three phase windings ($U_1$, $V_1$, and $W_1$ of the first motor 203, and the other three phase windings ($U_2$, $V_2$, and $W_2$) of the first motor 203 of the electric power steering apparatus are faulty, and cause the first motor 203 to lose all of steering assistance. The dual-point fault is a most serious fault case of the electric power steering apparatus.

When a single-point fault occurs in the electric power steering apparatus, the first motor 203 has remaining 50% of the steering assistance. If the second motor 204 is started, the electric power steering apparatus can still provide 75% of the steering assistance, which can meet a minimum requirement of L4 autonomous driving. When the dual-point fault occurs in the electric power steering apparatus, even if the second motor 204 is started, the electric power steering apparatus can provide only 25% of the steering assistance, which cannot meet a minimum requirement of L3 or L4 autonomous driving.

In some embodiments, when the single-point fault occurs in the electric power steering apparatus, the third control unit 207, or the control unit that can still run normally in the first control unit 205 and the second control unit 206 may send a first indication signal to the industrial computer of the vehicle through CAN communication, the first indication signal is used to indicate, to the industrial computer, information that no dual-point fault occurs in the electric power steering apparatus. When receiving the first indication signal, the industrial computer may limit some autonomous driving functions of the vehicle, to improve traveling safety of the vehicle, for example, degrade from L4 autonomous driving to L3 autonomous driving, or cancel a high-speed autonomous driving function.

In some embodiments, when the dual-point fault occurs in the electric power steering apparatus, the third control unit 207, or the control unit that can still run normally in the first control unit 205 and the second control unit 206 may send a second indication signal to the industrial computer of the vehicle through CAN communication, the second indication signal is used to indicate, to the industrial computer, information that the dual-point fault occurs in the electric power steering apparatus. When receiving the second indication signal, the industrial computer may control the vehicle to stop, to avoid a safety accident.

With reference to FIG. 14 to FIG. 19, the following lists some possible working modes of the electric power steering apparatus provided in embodiments of this application, to describe how the electric power steering apparatus continues to provide at least 75% of the steering assistance when a single-point fault occurs. In FIG. 14 to FIG. 19, a component that runs normally is shown by using a solid line, a faulty component is shown by using a dashed line, a motor in an enabled state is shown by using a shadow, and a motor in a stopped or standby state is shown by using a blank.

Figure 14:
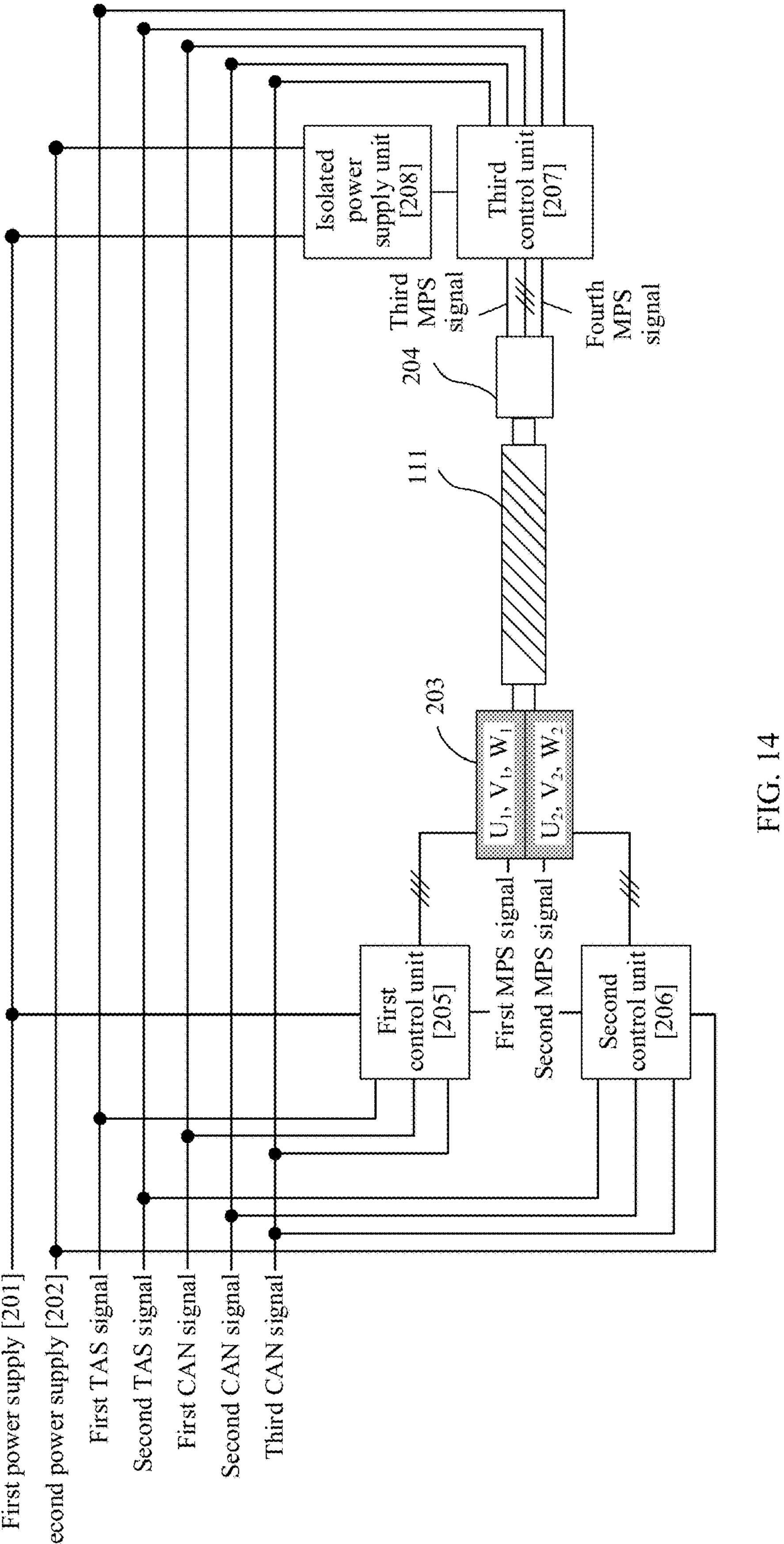
FIG. 14 is a diagram of a running status of an electric power steering apparatus with no fault.

FIG. 14 is a diagram of a running status of an electric power steering apparatus with no fault. As shown in FIG. 14, when the electric power steering apparatus is not faulty, the first control unit 205 and the second control unit 206 are in a normal running status, and jointly drive the first motor 203, to enable the first motor 203 to provide 100% of the steering assistance, and meet a requirement of L4 autonomous driving. In this case, the third control unit 207 is in the standby state and does not drive the second motor 204, and the second motor 204 does not work and is in the standby state. It may be understood that, because the electric power steering apparatus is not faulty, the control process circulates between step S101, step S102, and step S103 until a fault occurs.

Figure 15:
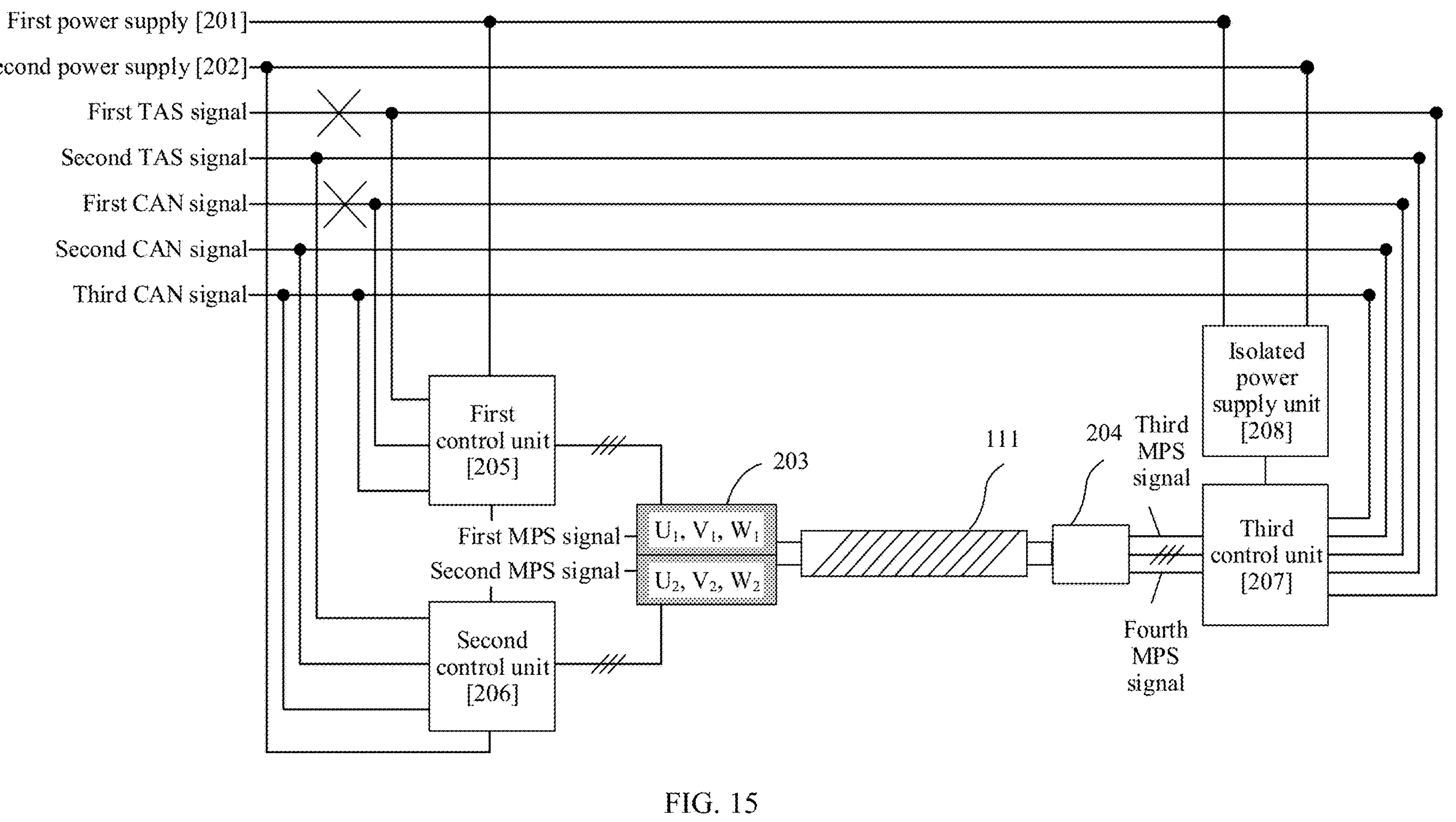
FIG. 15 is a diagram of a running status of an electric power steering apparatus with a TAS signal fault or a CAN signal fault.

FIG. 15 is a diagram of a running status of an electric power steering apparatus with a TAS signal fault or a CAN signal fault.

For example, as shown in FIG. 15, when the first TAS signal is faulty, the second control unit 206 may send the second TAS signal to the first control unit 205 by using the third CAN signal, to enable the first control unit 205 to perform servo control on the first motor 203 based on the second TAS signal. Similarly, when the second TAS signal is faulty, the first control unit 205 may send the first TAS signal to the second control unit 206 by using the third CAN signal, to enable the second control unit 206 to perform servo control on the first motor 203 based on the first TAS signal. It can be learned that the TAS signal fault does not affect providing of 100% of the steering assistance by the first motor 203, and the electric power steering apparatus can still meet the requirement of L4 autonomous driving.

For example, as shown in FIG. 15, when the first CAN signal is faulty, the second control unit 206 may send the second CAN signal to the first control unit 205 by using the third CAN signal, to enable the first control unit 205 to perform servo control on the first motor 203 based on the second CAN signal. Similarly, when the second CAN signal is faulty, the first control unit 205 may send the first CAN signal to the second control unit 206 by using the third CAN signal, to enable the second control unit 206 to perform servo control on the first motor 203 based on the first CAN signal. It can be learned that the CAN signal fault does not affect providing of 100% of the steering assistance by the first motor 203, and the electric power steering apparatus can still meet the requirement of L4 autonomous driving.

It may be understood that, when a TAS signal or a CAN signal is faulty, the electric power steering apparatus may further perform step S106 to limit some autonomous driving functions of the vehicle, for example, degrade from the L4 autonomous driving to the L3 autonomous driving, or cancel the high-speed autonomous driving function, to improve the traveling safety of the vehicle.

In this embodiment of this application, the single-point fault of the electric power steering apparatus may be summarized into three cases.

In a first case, the three phase windings ($U_1$, $V_1$, and $W_1$) of the first motor 203 and/or the first control unit 205 are/is faulty, and the three other phase windings ($U_2$, $V_2$, and $W_2$) of the first motor 203 and the second control unit 206 are normal. In this case, the other three phase windings ($U_2$, $V_2$, and $W_2$) of the second motor 204 provide 50% of the steering assistance.

In a second case, the three phase windings ($U_1$, $V_1$, and $W_1$) of the first motor 203 and the first control unit 205 are normal, and the other three phase windings ($U_2$, $V_2$, and $W_2$) of the first motor 203 and/or the second control unit 206 are/is faulty. In this case, the three phase windings ($U_1$, $V_1$, and $W_1$) of the first motor 203 provide 50% of the steering assistance.

In a third case, either of the first power supply 201 and the second power supply 202 is faulty.

Figure 16:
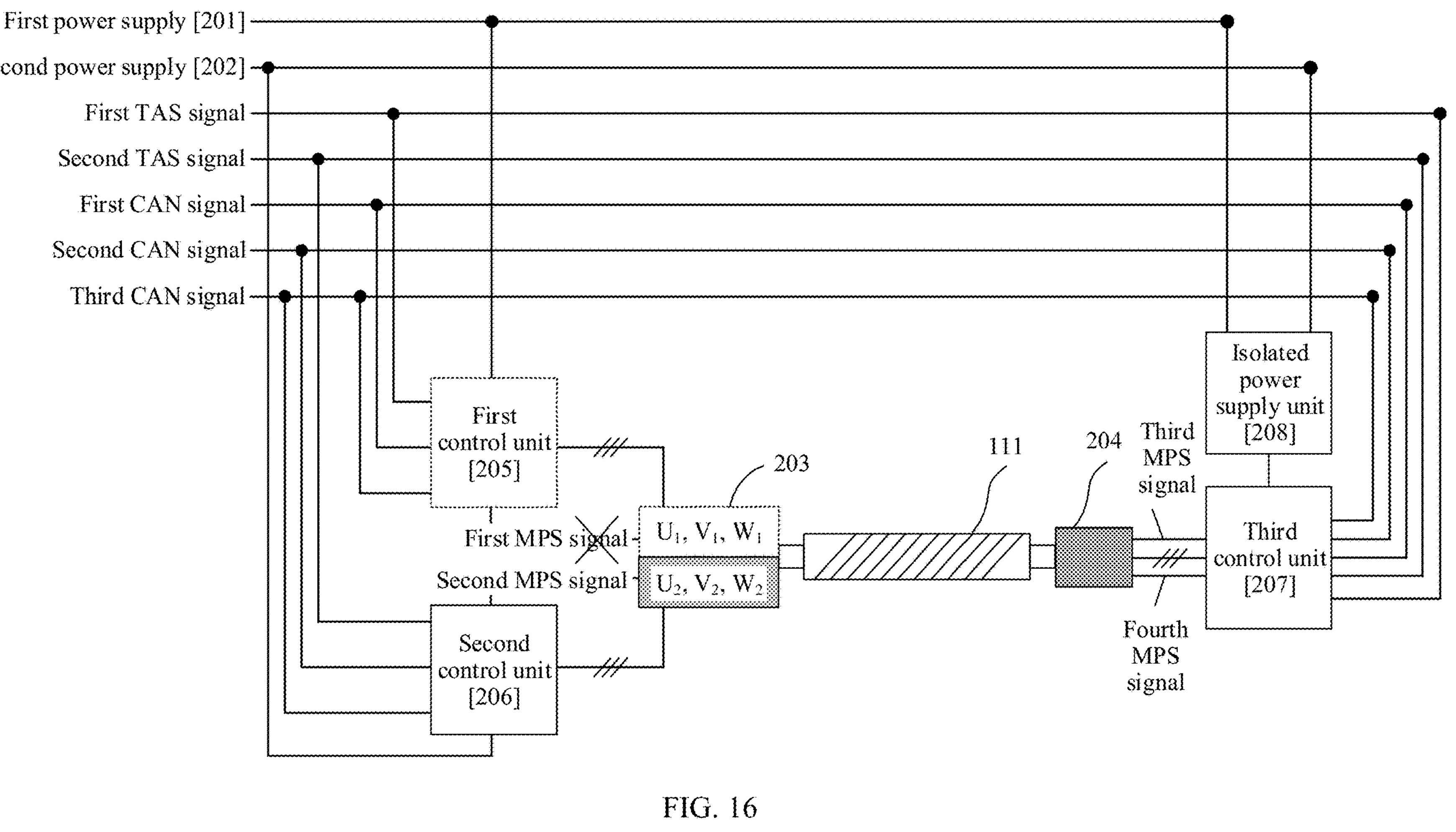
FIG. 16 is a diagram of a running status of an electric power steering apparatus with a single-point fault.

FIG. 16 is a diagram of a running status of an electric power steering apparatus with a single-point fault. When at least one of the first MPS signal, the second MPS signal, the first control unit 205, the second control unit 206, and the first motor 203 is faulty, and the first motor 203 loses 50% of the steering assistance, it may be considered that the single-point fault occurs in the electric power steering apparatus. For example, in FIG. 16, if the three phase windings ($U_1$, $V_1$, and $W_1$) of the first motor 203 are faulty, and the other parts of the apparatus are all normal, the first motor 203 loses 50% of the steering assistance. This is a single-point fault. For another example, if the first control unit 205 is faulty, and other parts of the apparatus are all normal, the first motor 203 loses 50% of the steering assistance because the three phase windings ($U_1$, $V_1$, and $W_1$) are not driven by the first control unit 205. This is also a single-point fault. For another example, if the first control unit 205, the first MPS signal, and the three phase windings ($U_1$, $V_1$, and $W_1$) of the first motor 203 are all faulty or faulty, and the other parts of the apparatus are all normal, the first motor 203 loses 50% of the steering assistance. This is similarly a single-point fault.

Figure 17:
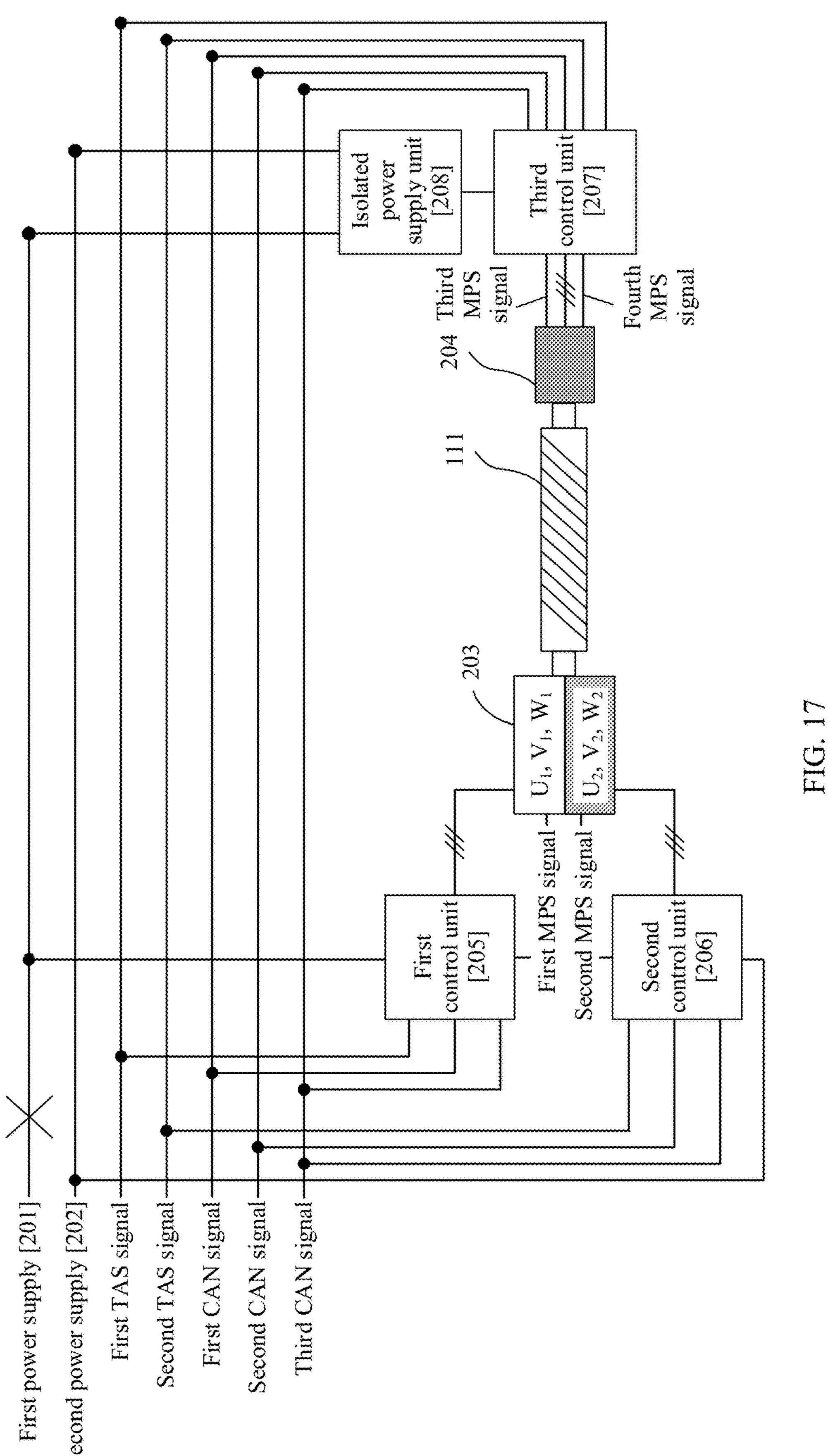
FIG. 17 is a diagram of a running status of an electric power steering apparatus with another single-point fault.

FIG. 17 is a diagram of a running status of an electric power steering apparatus with another single-point fault. When either of the first power supply 201 and the second power supply 202 is faulty, the first motor 203 loses 50% of the steering assistance. Therefore, it may be considered that a single-point fault occurs in the electric power steering apparatus. For example, in FIG. 17, if the first power supply 201 is faulty and cannot provide a sufficient supply voltage, the first control unit 205 cannot run normally, and the three phase windings ($U_1$, $V_1$, and $W_1$) of the first motor 203 cannot be driven. In this case, the first motor 203 loses 50% of the steering assistance. This is a single-point fault.

According to FIG. 16 and FIG. 17, when a single-point fault occurs in the electric power steering apparatus, the third control unit 207 starts the second motor 204 to provide at least 25% of the steering assistance, so that the electric power steering apparatus can provide 75% of the steering assistance, to meet the requirement of the L4 autonomous driving. In addition, the electric power steering apparatus may further perform step S106 in FIG. 8, to limit some autonomous driving functions of the vehicle, for example, degrade from the L4 autonomous driving to the L3 autonomous driving, or cancel the high-speed autonomous driving function, to improve the traveling safety of the vehicle.

Figure 18:
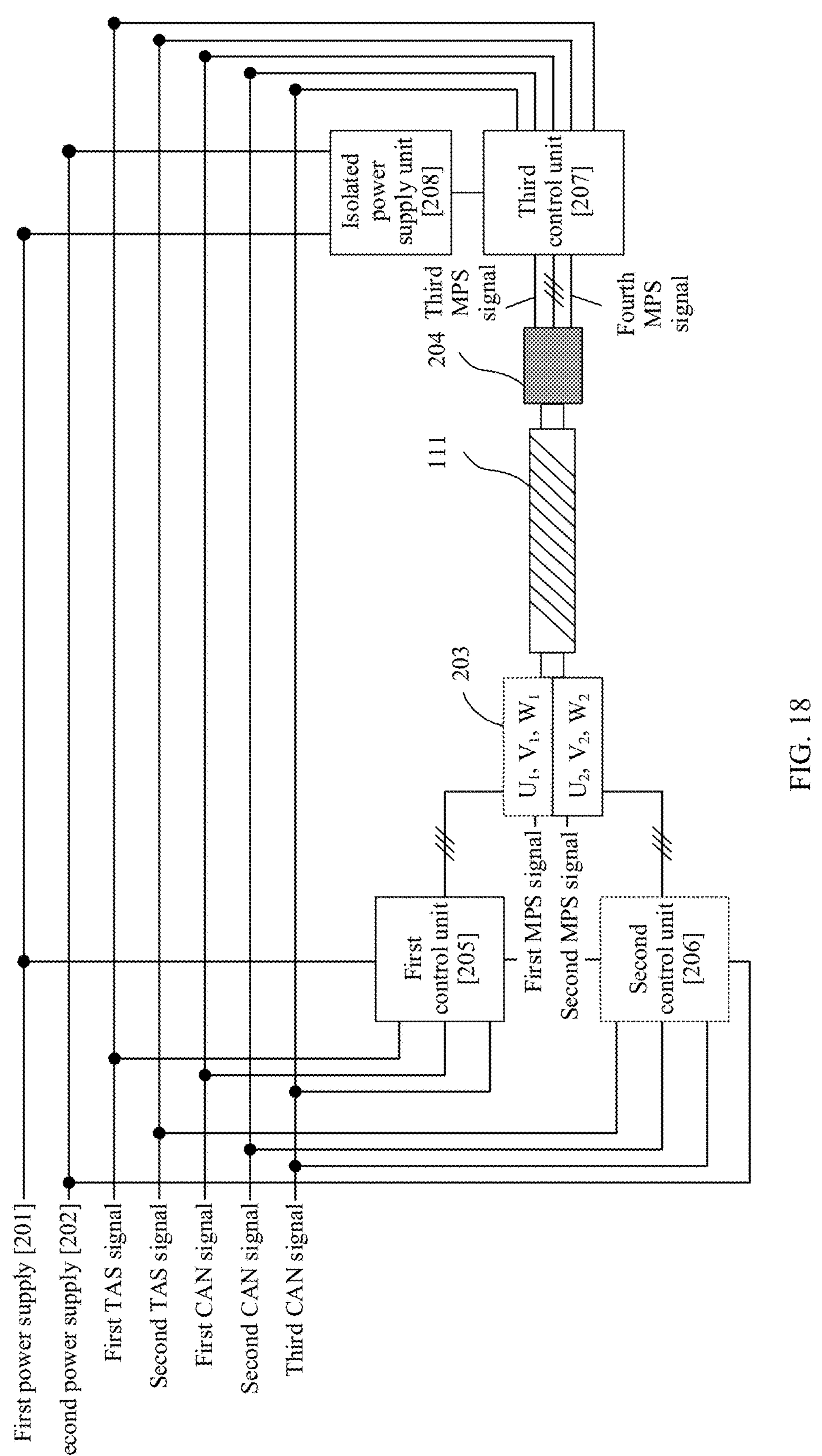
FIG. 18 is a diagram of a running status of an electric power steering apparatus with a dual-point fault.

FIG. 18 is a diagram of a running status of an electric power steering apparatus with a dual-point fault. When the three phase windings ($U_1$, $V_1$, and $W_1$) of the first motor 203 and/or the first control unit 205 are/is faulty, and the other three phase windings ($U_2$, $V_2$, and $W_2$) of the first motor 203 and/or the second control unit 206 are/is faulty, the first motor 203 stops rotating and cannot provide the steering assistance. Therefore, it may be considered that a dual-point fault occurs in the electric power steering apparatus. For example, in FIG. 18, the three phase windings ($U_1$, $V_1$, and $W_1$) of the first motor 203 are faulty and cannot be driven by the first control unit 205, the second control unit 206 is faulty and cannot drive the other three phase windings ($U_2$, $V_2$, and $W_2$) of the first motor 203. As a result, the first motor stops rotating. This is a dual-point fault. The electric power steering apparatus has only 25% of the steering assistance provided by the second motor. In this case, the electric power steering apparatus performs step S107 in FIG. 8, that is, the industrial computer of the vehicle controls the vehicle to stop, to avoid a safety accident.

This application further provides a computer storage medium. The computer storage medium stores computer instructions. When the computer instructions are run on a computer, the computer performs the method in the foregoing aspects.

This application further provides a computer program product including instructions. When the computer program product runs on a computer, the computer performs the method in the foregoing aspects.

This application further provides a vehicle. The vehicle may include the electric power steering apparatus provided in the foregoing aspects, and may be configured to perform the method in the foregoing aspects. The vehicle includes but is not limited to a fossil fuel-powered motor vehicle, a diesel-grid hybrid motor vehicle, a pure electric motor vehicle, engineering machinery with a driving capability, an automatic guided vehicle AGV, a robot with a driving capability, and the like.

This application further provides a chip system. The chip system includes a processor, configured to support the foregoing apparatus or device in implementing functions in the foregoing aspects, for example, generating or processing information in the foregoing methods. In a possible design, the chip system further includes a memory, configured to store program instructions and data that are necessary for the foregoing module or device. The chip system may include a chip, or may include a chip and another discrete component.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electric power steering apparatus, comprising:

a first motor, configured to provide steering assistance corresponding to rotation of a steering wheel, wherein the first motor is powered by two power supplies, and each of the two power supplies drives the first motor to generate part of the steering assistance; and a second motor, configured to provide additional steering assistance corresponding to the rotation of the steering wheel when the first motor loses part or all of the steering assistance, wherein the additional steering assistance comprises at least part of the steering assistance lost by the first motor, and the second motor is driven by an isolated power supplier that couples the two power supplies into one power supply, to generate the additional steering assistance.

2. The electric power steering apparatus according to claim 1, wherein the first motor comprises six phase windings; and the electric power steering apparatus further comprises:

a first controller, configured to be coupled to a first power supply of the two power supplies, and output the first power supply to three phase windings of the six phase windings; and a second controller, configured to be coupled to a second power supply of the two power supplies, and output the second power supply to the other three phase windings of the six phase windings.

3. The electric power steering apparatus according to claim 2, further comprising:

a third controller, configured to be coupled to the isolated power supplier, and output the power supply coupled by the isolated power supplier to the second motor.

4. The electric power steering apparatus according to claim 3, wherein the first controller is further configured to obtain a first torque angle sensor (TAS), signal from a TAS; and the second controller is further configured to obtain a second TAS signal from the TAS, wherein the first TAS signal and the second TAS signal indicate at least one of an angle or torque of the rotation of the steering wheel.

5. The electric power steering apparatus according to claim 4, wherein the first controller is further configured to obtain a first controller area network (CAN) signal from a CAN, and determine whether the first CAN signal is normal;

the second controller is further configured to obtain a second CAN signal from the CAN, and determine whether the second CAN signal is normal; and the first controller or the second controller is further configured to determine whether the first TAS signal and the second TAS signal are normal.

6. The electric power steering apparatus according to claim 5, wherein at least one of the first controller or the second controller is further configured to send a first indication signal to an industrial computer of a vehicle when at least one of the first TAS signal, the second TAS signal, the first CAN signal, or the second CAN signal is faulty, wherein the first indication signal instructs the industrial computer to lower an autonomous driving level of the vehicle.

7. The electric power steering apparatus according to claim 5, wherein the first controller is further configured to obtain a first motor position sensor (MPS) signal from a MPS; and the second controller is further configured to obtain a second MPS signal from the MPS, wherein the first MPS signal and the second MPS signal indicate a rotor position of the first motor.

8. The electric power steering apparatus according to claim 7, wherein when the first TAS signal, the second TAS signal, the first CAN signal, and the second CAN signal are all normal, the first controller is further configured to determine whether the first MPS signal and the first power supply are normal, the second controller is further configured to determine whether the second MPS signal and the second power supply are normal, and at least one of the first controller or the second controller is further configured to determine whether the first motor is normal.

9. The electric power steering apparatus according to claim 8, wherein when the first TAS signal, the second TAS signal, the first CAN signal, and the second CAN signal are all normal, the first controller is further configured to determine whether the first controller is normal, and the second controller is further configured to determine whether the second controller is normal.

10. The electric power steering apparatus according to claim 9, wherein the third controller is further configured to start the second motor when at least one of the first MPS signal, the second MPS signal, the first controller, the second controller, the first power supply, the second power supply, or the first motor is faulty.

11. The electric power steering apparatus according to claim 10, wherein the third controller is further configured to send a second indication signal to an industrial computer of a vehicle when the three phase windings of the first motor or the first controller is faulty, and the other three phase windings of the first motor or the second controller is faulty, wherein the second indication signal instructs the industrial computer to control the vehicle to stop.

12. The electric power steering apparatus according to claim 10, wherein the third controller is further configured to send a first indication signal to an industrial computer of a vehicle when the three phase windings of the first motor or the first controller is faulty, and the other three phase windings of the first motor and the second controller are normal, wherein the first indication signal instructs the industrial computer to lower an autonomous driving level of the vehicle.

13. The electric power steering apparatus according to claim 10, wherein the third controller is further configured to send a first indication signal to an industrial computer of a vehicle when the three phase windings of the first motor and the first controller are normal, and the other three phase windings of the first motor or the second controller is faulty, wherein the first indication signal instructs the industrial computer to lower an autonomous driving level of the vehicle.

14. The electric power steering apparatus according to claim 8, wherein when the first TAS signal, the second TAS signal, the first CAN signal, and the second CAN signal are all normal, the first controller is further configured to communicate with the second controller by using a third CAN signal of the CAN, to determine whether the second controller is normal, and the second controller is further configured to communicate with the first controller by using the third CAN signal, to determine whether the first controller is normal.

15. The electric power steering apparatus according to claim 8, wherein when the first TAS signal, the second TAS signal, the first CAN signal, and the second CAN signal are all normal, the third controller is further configured to communicate with the first controller by using a third CAN signal, to determine whether the first controller is normal, and the third controller is further configured to communicate with the second controller by using the third CAN signal, to determine whether the second controller is normal.

16. The electric power steering apparatus according to claim 8, wherein the first controller is configured to obtain a voltage of the first power supply, and determine whether the first power supply is normal based on the voltage of the first power supply; and the second controller is configured to obtain a voltage of the second power supply, and determine whether the second power supply is normal based on the voltage of the second power supply.

17. The electric power steering apparatus according to claim 8, wherein the first controller is configured to obtain an input current of the three phase windings, and determine whether the first motor is normal based on the input current of the three phase windings or the first MPS signal; and the second controller is configured to obtain an input current of the other three phase windings, and determine whether the first motor is normal based on the input current of the other three phase windings or the second MPS signal.

18. A control method, applied to an electric power steering apparatus, wherein the electric power steering apparatus comprises a first motor and a second motor; the first motor is powered by two power supplies, each of the two power supplies drives the first motor to generate a part of steering assistance corresponding to rotation of a steering wheel, and the second motor is driven by one power supply coupled from the two power supplies, to generate additional steering assistance; and the method comprises:

shutting down the second motor when the first motor provides the steering assistance corresponding to the rotation of the steering wheel; and starting the second motor when the first motor loses part or all of the steering assistance corresponding to the rotation of the steering wheel.

19. A vehicle, comprising:

an electric power steering apparatus, wherein the electric power steering apparatus comprises:

a first motor, configured to provide steering assistance corresponding to rotation of a steering wheel, wherein the first motor is powered by two power supplies, and each of the two power supplies drives the first motor to generate part of the steering assistance; and a second motor, configured to provide additional steering assistance corresponding to the rotation of the steering wheel when the first motor loses part or all of the steering assistance, wherein the additional steering assistance comprises at least part of the steering assistance lost by the first motor, and the second motor is driven by an isolated power supplier that couples the two power supplies into one power supply, to generate the additional steering assistance.

20. The vehicle according to claim 19, wherein the first motor comprises six phase windings; and the electric power steering apparatus further comprises:

a first controller, configured to be coupled to a first power supply of the two power supplies, and output the first power supply to three phase windings of the six phase windings; and a second controller, configured to be coupled to a second power supply of the two power supplies, and output the second power supply to the other three phase windings of the six phase windings.

* * * * *